United States Patent [19]

Tam et al.

[11] Patent Number: 5,412,809
[45] Date of Patent: May 2, 1995

[54] DISK DRIVE POWER CONTROL CIRCUIT AND METHOD

[75] Inventors: Karman Tam, Irvine; Erik Moe, Huntington Beach; Hanan Kupferman, Diamond Bar, all of Calif.

[73] Assignee: Mitsumi Electric Co., Ltd., Kanagawa, Japan

[21] Appl. No.: 975,503

[22] Filed: Nov. 12, 1992

[51] Int. Cl.⁶ .................... G11B 19/28; G11B 21/02; G06F 1/32
[52] U.S. Cl. .................. 395/750; 360/73.03; 364/236.2; 364/248.1; 364/DIG. 1
[58] Field of Search ............... 395/750, 275, 775; 364/707; 360/73.01, 75, 97.01; 388/811

[56] References Cited

U.S. PATENT DOCUMENTS

| Re. 32,075 | 1/1986 | Harrison et al. | 360/77 |
| 4,783,706 | 11/1988 | Shoji et al. | 360/78 |
| 4,799,112 | 1/1989 | Bremmer et al. | 360/31 |
| 4,839,754 | 6/1989 | Gami et al. | 360/73.01 |
| 4,879,498 | 11/1989 | Shinohara et al. | 318/254 |
| 4,918,651 | 4/1990 | Bonke et al. | 364/900 |
| 4,933,785 | 6/1990 | Morehouse et al. | 360/78.04 |
| 4,991,129 | 2/1991 | Swartz | 364/707 |
| 5,025,335 | 6/1991 | Stefansky | 360/97.01 |
| 5,034,837 | 7/1991 | Schmitz | 360/105 |
| 5,167,024 | 11/1992 | Smith et al. | 395/375 |
| 5,182,685 | 1/1993 | Krause et al. | 360/78.13 |
| 5,231,549 | 7/1993 | Morehouse et al. | 360/75 |
| 5,246,479 | 9/1993 | Gami et al. | 360/73.03 |

Primary Examiner—Gopal C. Ray
Attorney, Agent, or Firm—Knobbe, Martens, Olson & Bear

[57] ABSTRACT

A disk drive control circuit and method controls electric power consumption in a disk drive so that a computer system such as a laptop computer can conserve power and as a result can dramatically reduce the effective life of batteries employed as a power source of the computer system. The disk drive control circuit and method is effective in reducing a power consumption for very small form factor disk drives. A technique is provided to allow the user to adopt the performance versus power consumption to meet the system requirements. The control circuit and method effectively controls transient currents associated with initiation of mechanical operation such as an actuator for actuating a magnetic head and a spindle motor for rotating a magnetic disk at high speed with optimum starting time. The disk drive control circuit and method includes a micro-controller for controlling a total operational procedure for reducing an electric power consumption programmed by a vendor or instructed by a user in addition to an overall operation of the disk drive. The disk drive control circuit also includes a memory for storing a set of programs for the operation of the disk drive. The memory includes profiles (such as current versus access time table) for the current control. An actuator current control limits the flow of current to the actuator based on instructions from the micro-controller. A spindle motor current control limits the flow of current to the spindle motor based on instructions from the micro-controller.

11 Claims, 14 Drawing Sheets

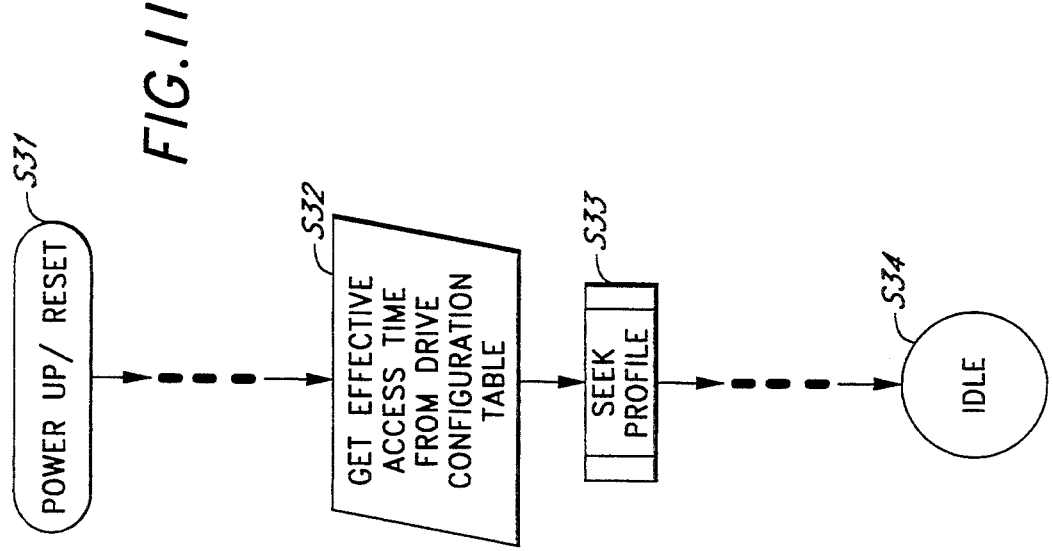
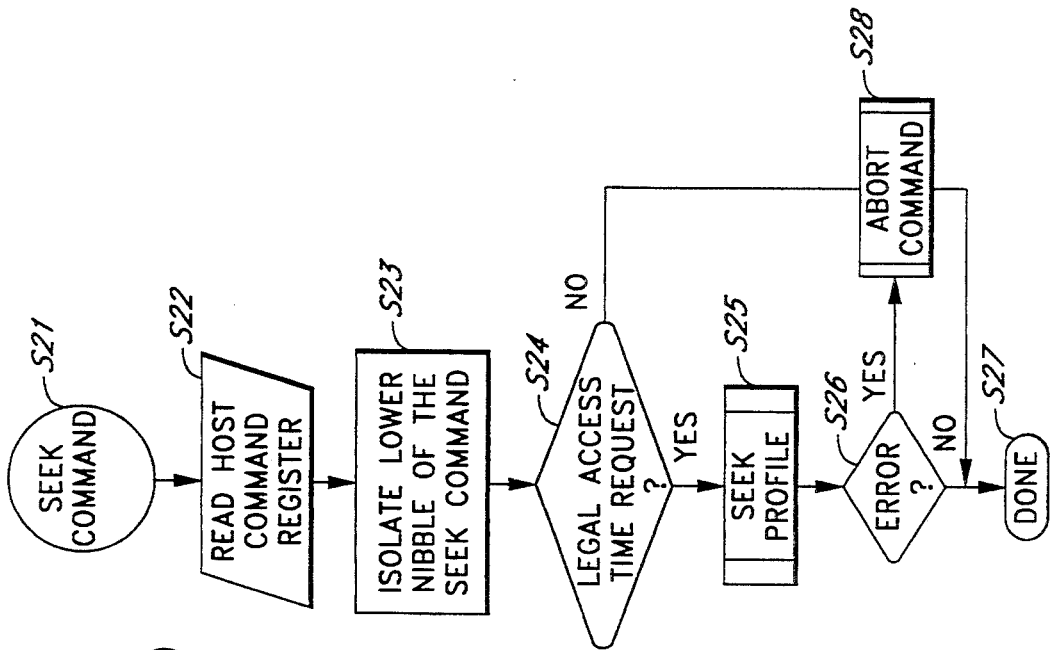

DISK DRIVE POWER CONTROL CIRCUIT AND METHOD

FIELD OF THE INVENTION

This invention relates to small form factor disk drives for computers and, more specifically, to an improved method and circuit for reduction of electric power consumption in such disk drives.

BACKGROUND OF THE INVENTION

Disk drive memory systems ("disk drives") have been used to store information for computers, word processors, computer controlled information retrieval systems and the like, for many years. In disk drives, information, usually in forms of digital electronic signals, is recorded on concentric memory tracks on magnetic disks. As is well known in the art, there are two basic kinds of disk drives: "floppy" disk drives and "hard" disk drives. In both kinds of disk drives, disks are rotatably mounted on a spindle. Read/write heads, generally located on pivoting arms, move radially over the surface of the disks to access different memory locations. There may be as many as 800 or more memory tracks per radial inch of a disk. Each track is also divided into a plurality of sectors, 36–72 sectors for example, and each sector can store a plurality of bytes of digital data, typically 512 bytes or 1,024 bytes.

To ensure proper writing and reading of the information, a read/write head must be accurately aligned with an appropriate track on a disk. Floppy disk drives store information on interchangeable, flexible and magnetic disks. Hard disks store information on rigid non-interchangeable disks (but, can be interchangeable), commonly made of aluminum coated with magnetic material. Hard disks have a much higher storage density than floppy disks, and as a consequence, hard disk drives require more accurate positioning capabilities of magnetic heads on the surface of the hard disk than that of the floppy disk drive.

Disk drives, especially small form factor disk drives are often located within the housing of a computer and receive instructions from the host computer to read/write information on the disk. The small form factor disk drives may comprise multiple hard disks stacked on top of each other within the drive for increasing memory capacity. The disks are spun at high speeds, for example 3,600 rpm (revolutions per minute), by a spindle motor to allow rapid writing and reading of information on the disk.

The advent of personal and portable computer systems which are sometimes called "laptop computers" or "notebook computers", has placed a premium on providing disk drives of reduced size and weight. The relative size of disk drives is commonly referred to as its form factor. Form factors of 2.5 inches (6.25 cm) and even smaller have become relatively commonplace.

In addition to reducing size and weight of the disk drives in connection with the laptop computers, it is also important to make available electric power saving features since laptop and notebook computers are typically battery-powered, and it is desirable to reduce battery drain. Namely, because of the reduction of the power consumption in the computers by the development of semiconductor technology, it has become possible to power the computers by batteries. Further, the recent computers are so compact that the requirements arise in carrying the computers anywhere without a commercial power source or power outlets. Thus, it is extremely important that power dissipation in the disk drives be minimized so that the computers can be operable for a longer period time by relatively small batteries.

Furthermore, in the computer systems, there are always requests by users for increasing a speed of a disk drive. One factor for increasing the speed of the disk drive is to reduce an access time of the disk drive. The access time is a time required for the disk drive to start performing the read/write operation after receiving the instructions from the host computer. The access time includes a seek time which is a time required for the magnetic head changes its position from one place to another on the magnetic disk. In reality, the seek time accounts for the most of the access time since it involves a mechanical movement which is clearly slower than the electrical operation. In a typical small factor disk drive, an access time ranges from 15 millisecond to 30 millisecond.

Other requirements in disk drives associated with speed of the operation is a spindle motor starting time which is a time required for the spindle motor to start rotation and reach to the rated rotation speed. This type of operation arises when the disk drive is initiated from a "sleep" state or a "standby" state, wherein the spindle motor is not provided with electric power and thus it is at rest (non-rotation state). Thus, it is important in such disk drives to reduce a transient time (or settling time) required for the spindle motor starting from the non-rotation state to reach a predetermined rotation speed. However, the time required for the spindle motor to reach the predetermined rotation rate is relatively large, such as 15–30 seconds, which is thousand times larger than the access time. There is a further interest directed to reducing the peak starting current of the spindle motor for eliminating the adverse effect to the battery and thus increasing the battery life.

In such a disk drive, major parts of the drive that dissipate most of the electric power are, a spindle motor for rotating the disk in high speed, an actuator assembly for driving the magnetic heads to the designated position on the disk for reading and writing data, and disk drive electronics (i.e., an electronic circuit) for controlling the operation of the disk drive. In one portable computer system, it is known to reduce power usage by powering down certain of the disk drive electronics upon the occurrence of a single, predetermined event or condition. U.S. Pat. No. 4,568,988 to McGinlay et al. shows an example of reduction of power dissipation by such powering down. Namely, McGinlay et al. discloses means for reducing current drawn by a stepper motor when the disk drive has been deselected for more than a predetermined time length such as two seconds.

Further improved means for reduction of the electric power dissipation is disclosed in U.S. Pat. No. 4,933,785 to Morehouse et al. issued Jun. 12, 1990. In Morehouse et al., two power saving modes are provided. One mode involves maintaining power to a disk drive intelligent interface electronics, disk controller and a spin motor assembly while powering down virtually all other electronics. In this mode, the disk drive microprocessor is maintained in a low power mode, i.e., it is not consuming power due to changing binary states. Under software control, this mode of operation is invoked using a default time, for example, five seconds after the last disk access by the read/write head.

The second mode for lowering the power consumption in this prior art is a spun down deselected mode in which only the disk drive intelligent interface and disk controller are fully powered. In this mode, not only is the disk drive microprocessor in its lower power state but the spin motor assembly is powered down. This mode of operation is invoked using a longer default time, for example, 20 seconds after the last disk access.

However, these prior disk drives do not give consideration to large power consumptions by transient currents. The transient currents include dynamic currents flowing especially at the start of mechanical movement of a spindle motor and the magnetic head when the spindle motor starts rotation and the magnetic head changes position from one position to other. Any disk drive in the market includes a spindle motor for rotation of the magnetic disk and an actuator for accessing the magnetic head from one place to another on the disk. These spindle motor and actuator require driving coils for generating forces to drive magnets or magnetic circuits therein. Therefore, a relatively large amount of current flows when the motor is driven from its static state to start rotation and attain its constant velocity state. Also, relatively large current flows when the actuator is driven from its read/write state at one position to another position.

Because the electrical power consumption in the electronic circuits has been remarkably decreased because of the development in the semiconductor technology, the power consumption in the spindle motor drive and the actuator drive are major components that account for most of the power consumption in the disk drives. Furthermore, because the actuator drive and the spindle motor utilize coils for generating magnetic fields, large transient currents (peak currents) flow through the coils at the initiation of such movement. It is well known in the art that this type of large peak current or surge current will deteriorate battery life. Thus, it is important to reduce the transient current to elongate battery life.

In such disk drives, however, the relationship between the amount of transient current and time required to reach to the target conditions, i.e., the rated rotational speed of the motor and/or the destined position of the magnetic head is incompatible. Namely, if the transient current is reduced, a longer time is usually required for the motor to reach the predetermined steady state rotation rate. Similarly, if the transient current is reduced, longer access time or seek time (i.e., time required for the read/write head to reach from one location to another on the disk surface) is required for the actuator.

Therefore, in the prior art disk drives, reduced power requirements of the small form factor disk drives used in portable computers environments, such as laptop computers, creates a situation where the access time is increased to reduce power consumption in the disk or the power consumption is increased in order to decease the access time. Similarly, in the disk drives, the starting time of the spindle motor is increased to reduce the peak starting current or the peak starting current is increased in order to decrease the spindle motor starting time. In the spindle motor, however, if the spindle motor is initiated from a non-rotation state ("sleep mode" or "standby mode"), the reduction of the starting time is not very important since it takes several tens of seconds. Thus, in driving the spindle motor, it is more important to reduce the amount of peak drive current which can successfully overcome friction in the disk drive and bring the spindle motor into rotation.

Therefore, there is a need for a small form factor disk drive which is capable of further decreasing electric power consumption in the disk drive with an optimum access time of a read/write head which can be selective either by manufacturers or by the user of the disk drive. Also, there is a need for a small form factor disk drive which is capable of automatically selecting an optimum start up current for the spindle motor to minimize the start up current while overcoming resistance of sticktion in the disk drive.

SUMMARY OF THE INVENTION

The present invention is directed to a disk drive control circuit and method for controlling electric power consumption in disk drives so that computer systems such as laptop computers can conserve power and as a result can dramatically reduce the effective life of batteries employed as a power source of the computer systems.

The present invention provides an improved power control circuit and method for reducing power consumption and surge currents for very small form factor disk drives. According to the present invention, unlike the prior art disk drives which specify fixed performance (such as access time) and power consumption parameters, a technique is provided to allow the user to adopt the performance versus power consumption to meet the system requirements. The present invention effectively controls transient currents associated with initiation of mechanical operation such as an actuator for actuating a magnetic head and a spindle motor for rotating a magnetic disk at high speed with optimum access time and starting time, respectively.

The disk drive control circuit and method of the present invention comprises a micro-controller for controlling a total operational procedure for reducing electric power consumption programmed by a vendor or instructed by a user in addition to an overall operation of the disk drive, a memory for storing a set of programs for the operation of the disk drive as above. The memory includes profiles (such as current versus access time table) for the current control. The present invention further comprises an actuator current control for limiting a flow of current to the actuator based on instructions from the micro-controller, and a spindle motor current control for limiting a flow of current to the spindle motor based on instructions from the micro-controller.

The disk drive control circuit and method of the present invention can limit a starting current for the spindle motor which is greater than a sticktion (static and dynamic resistance) force of the disk drive so that the spindle motor starts rotation. In the case where the control circuit provides the spindle motor the minimum required current for rotation, the longest time is needed for the spindle motor to reach the predetermined rotation rate. On the other hand, if a larger current is provided to the spindle motor, the required rotation rate of the spindle motor will be achieved in a smaller time. The present invention automatically selects the lowest possible start up current for the spindle motor, since the settling time for the spindle motor to attain the required rotation rate is usually not very important. However, depending on the user's needs, a computer user can select either the automatic spindle motor current control of the present invention or the fixed large drive current for achieving the user's purposes.

Similarly, the disk drive control circuit and method of the present invention can limit a drive current for the actuator assembly which is greater than a sticktion force of the actuator drive, typically caused by the sticktion between a magnetic head and a disk surface, so that the actuator can change its position to the target position. In the case where the control circuit provides the actuator the minimum required current for the movement, the longest time is needed for the actuator to reach the new position on the disk. On the other hand, if a larger current is provided to the actuator, the required position change on the surface of the disk will be achieved in a shorter time. Thus, depending on the necessity, a computer user can select required access time versus power consumption conditions.

The current control of the present invention for the actuator assembly can be achieved either by a manufacturer's initial programming (referred to "vendor unique command") or by a user's selection through the host computer (referred to "seek command"). In either case, the disk drive of the present invention includes ranges of acceptable setting of "access time versus drive current" in the program. Thus, the requested access time is range checked by the program in the disk drive, and if the request is acceptable, the disk drive automatically alters its access time versus drive current (power consumption) relationship accordingly.

The current control of the present invention for the spindle motor can be achieved by a manufacturer's initial programming for automatically selecting the optimum driving current which is large enough to rotate the spindle motor. When the spindle motor is at rest, it is necessary to provide a driving current which can overcome a sticktion of the disk drive. The sticktion is a resistance in the disk drive system caused, for example, by the friction between the surface of the disk and the read/write head. The amount of sticktion varies depending on the time, environmental change, and wear-out in the disk drive. Therefore, in the present invention, the program can automatically select the smallest current which can overcome the sticktion in a varied environment of the disk drive. This approach will increase the time required for the spindle motor to be settled in the rated rotation rate, such as 3,600 rpm, however, the reduction of the driving current is considered to be more important in this invention rather than the settling time. This is because the settling time of the spindle motor is about a thousand times larger than the access time of the actuator drive, and thus, the reduction of the settling time in the spindle motor does not make much improvement in the speed of the disk drive.

The current control circuit of the present invention also functions as a current limiter so that the present invention can effectively suppress a spike current at the start of the access in the disk drive for read/write operation and the start of the spindle motor rotation. The suppression of the spike current can contribute to further reduction of the power consumption in the disk drives. As is well known in the art, the suppression of the spike current (surge current) can help elongate battery life since the life of dry cell type batteries are largely affected by such spike or surge currents.

According to one aspect of the present invention, the disk drive control circuit and method of the present invention includes a standard profile for determining the access time versus power consumption in the actuator assembly. The user of the computer can freely choose the conditions defined in the profile. The control circuit (micro-controller) of the present invention can evaluate the conditions instructed by the user based on the standard profile. Thus, if an inadequate condition is set by the user, the control circuit of the present invention can reject such conditions until allowable conditions are selected.

According to another aspect of the present invention, the disk drive control circuit and method of the present invention includes a program for determining the smallest possible driving current for the spindle motor which can overcome the resistance caused by the sticktion. The disk drive is programmed to seek the smallest drive current (start up current) which is greater than the sticktion to start rotation of the spindle motor. In the preferred embodiment, three driving currents, 400 mA, 600 mA and 800 mA are provided. The program can automatically determine out which drive current is suitable for starting the rotation. If necessary, the user can suppress this automatic procedure for selecting the lowest drive current and use the conventional way of driving the spindle motor by the fixed, large amount of drive current.

BRIEF DESCRIPTION OF THE DRAWINGS

FIG. 10 is a schematic flowchart of an overall operation of the disk drive control method of the present invention showing a sequence of reduction of power consumption based on a seek command.

FIG. 11 is a schematic flowchart of an operation of the disk drive control method of the present invention showing a sequence of extracting an access time previously used before a source power of the disk drive has been off or a reset status in a host computer.

DETAILED DESCRIPTION OF THE INVENTION

Figure 1:
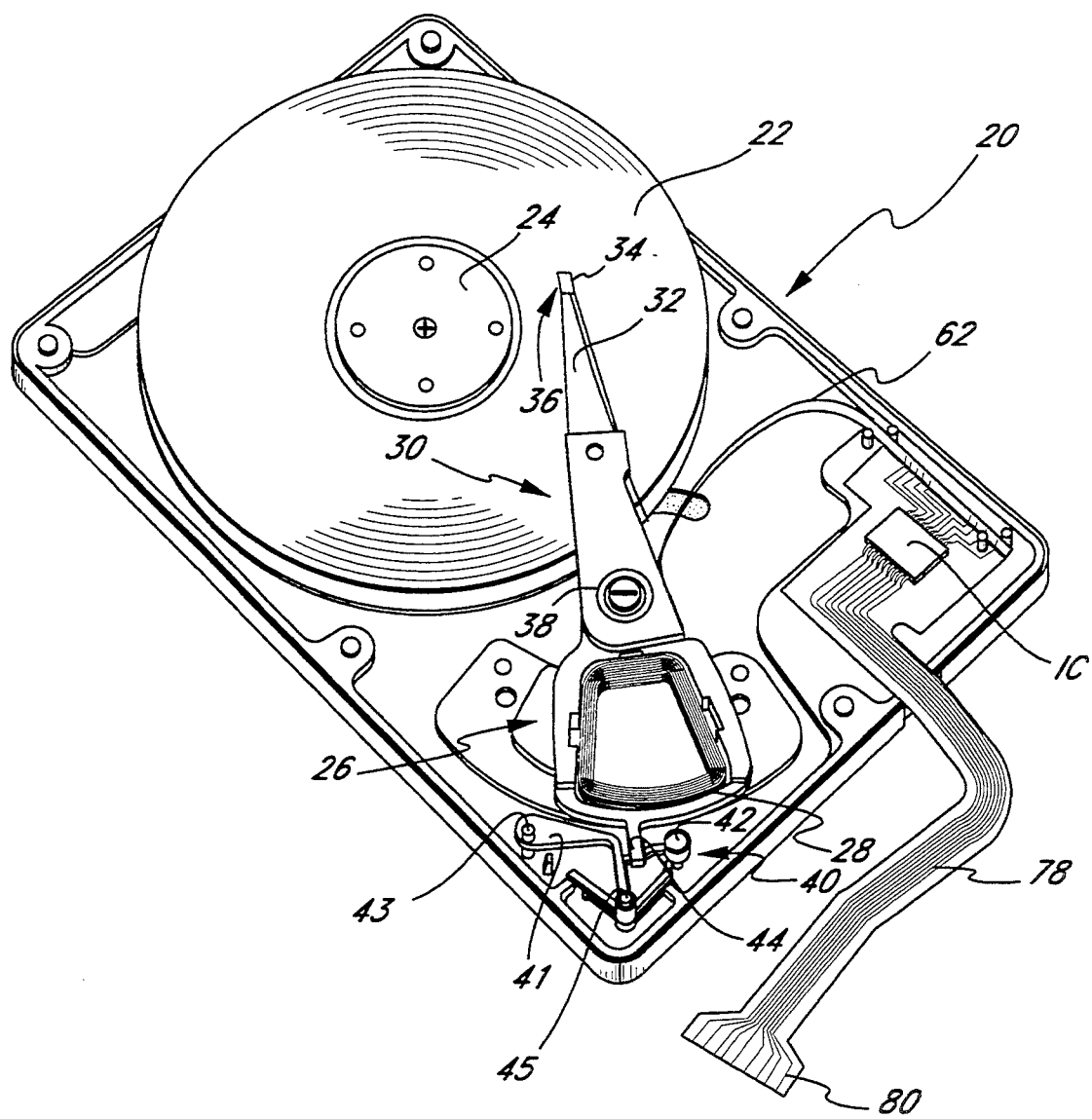
FIG. 1 is a perspective view of a small form factor disk drive incorporating the disk drive control circuit and method of the present invention.

To facilitate a better understanding of the present invention, description will first be made to a hard disk drive for which a power control circuit and method of the present invention would preferably employed.

General Description of Disk Drive

In accordance with the present invention, a disk drive apparatus including an improved power control circuit and method is provided for use with a computer system, such as a laptop or notebook computer. With reference to a perspective view of FIG. 1, the disk drive apparatus includes a housing 20 for containing the disk drive hardware that includes one or more hard disks 22. Although not shown in FIG. 1, a print circuit board is provided, for example, underneath the housing 20 for assembling electric circuit components of a disk drive electronics. Each of the disks 22 preferably has an approximately 2.5 inch (6.25 cm) diameter and each of the two sides or surfaces of the disk 22 is capable of storing, for example, about 20–40 MBytes of information in the formatted state of the disk 22. In the embodiment best illustrated in FIG. 3, two hard disks 22a, 22b are provided so that 80 ∝ 160 MBytes of information are capable of being stored by the disk drive apparatus, although it is expected that this storage capacity will increase due to future enhancements.

Each of the hard disks 22 is rotated by means of a spindle motor assembly 24, which assembly is depicted in more detail in FIG. 3 and will be subsequently discussed therein. As also seen in FIG. 1, a rotary actuator assembly 26 is provided adjacent to the disk 22 for use in reading information and writing information onto the surface of the disk 22. The actuator assembly 26 includes an actuator coil 28 through which current is passed for causing rotational movement of the actuator assembly 26.

An actuator arm assembly 30 is also part of the actuator assembly 26. The actuator arm assembly 30 includes an actuator arm or load beam 32 which is generally triangular-shaped. Disposed adjacent to the free end of the load beam 32 is a flexure 34 which is flexibly mounted on the load beam 32. A transducer or read/write head 36 (not shown but underneath the flexure 34) is attached to the flexure 34 and extends therefrom in a direction towards the surface of the disk 22. The actuator arm assembly 30 incorporates the actuator pivot 38, which constitutes the pivotal axis about which the actuator arm assembly 30 is able to rotate in order for the read/write head 36 to access desired or target positions on the disk surface.

FIG. 1 also shows a rear portion 40 of the actuator assembly 26. The rear portion 40 includes a traveling member, or moving member, 44. In the preferred embodiment, the rear portion 40 comprises non-magnetic material formed of, for example, plastic or fiber material. The non-magnetic rear portion acts to break any current loop which might be formed by the metal portions of the remainder of the actuator assembly 26, and additionally allows for balancing the actuator assembly 26 around the pivot 38, as is well known to be desired in such disk drive actuator assemblies. Also, the non-magnetic material does not interfere with the magnetic field return paths associated with the coil and motor operation.

The rear portion 40 and the included moving member 44 work in combination with a first stopping member 42 and a second stopping member 43, so as to provide a novel and non-obvious crash stop. The rear portion also includes a stopping spring 41 and a hub 45. The details of the rear portion 40 and its associated stopping members are provided in the U.S. patent application Ser. No. 975,386, entitled "ROTARY DISK DRIVE ACTUATOR", and filed Nov. 12, 1992 by the same assignee of the present invention.

A further important part of the disk drive apparatus, as illustrated schematically in FIG. 1, is the flexible circuit 62. The flexible circuit 62 comprises a flexible material with etched circuitry for use in, among other things, transmitting information from and to the read/write heads 36. A portion of the flexible circuit 62 is attached to the housing while an end portion of the flexible circuit 62 is attached to the actuator arm assembly 30.

An integrated circuit (IC) is mounted on the flexible circuit 62. Further, the other end of the flexible circuit 62 is also a flexible circuit 78 which has a connection terminal 80 to interface with a drive controller electronics. During rotational movement of the actuator body 30, the flexible circuit 62 is able to change its configuration so that zero torque is applied by the flexible circuit 62 to the actuator assembly 26.

Figure 3:
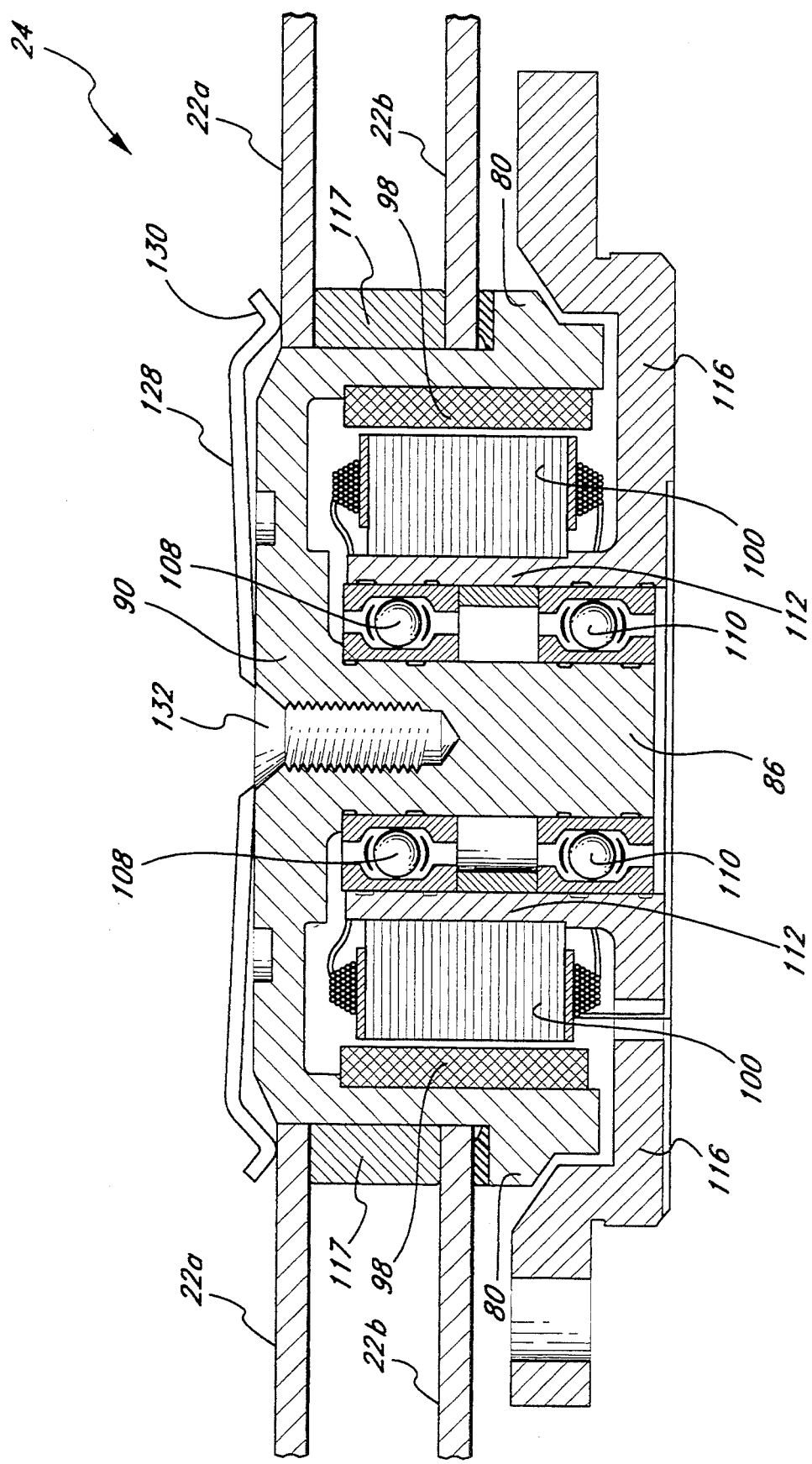
FIG. 3 is a cross-sectional view of a spindle motor which can be employed in the present invention.

A spindle motor is hidden in FIG. 1 underneath the spindle motor assembly 24 but its cross sectional view is shown in FIG. 3, which will be described in more detail later. In this configuration, as shown in FIG. 3, two disks 22a, 22b are stacked on the spindle motor 90 and a second actuator arm (not shown) extends between the two disks to read and/or write from the lower disk which is well known in the art. This configuration is not meant to limit the scope of the present invention, it being well known that more than one disk may be stacked in small form factor disk drives.

Figure 2A:
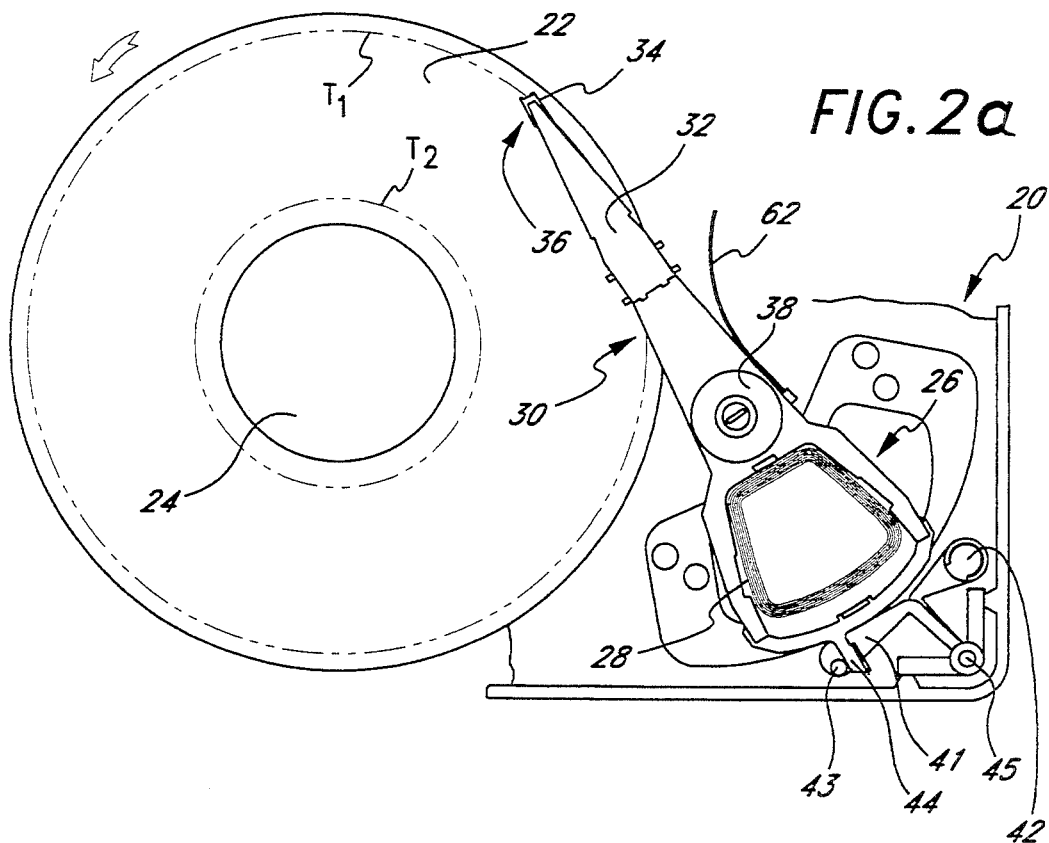
FIG. 2a is a plan view of the disk drive for showing an example of a rest state wherein a magnetic head and thus an actuator is positioned at an outer track of the disk.
Figure 2B:
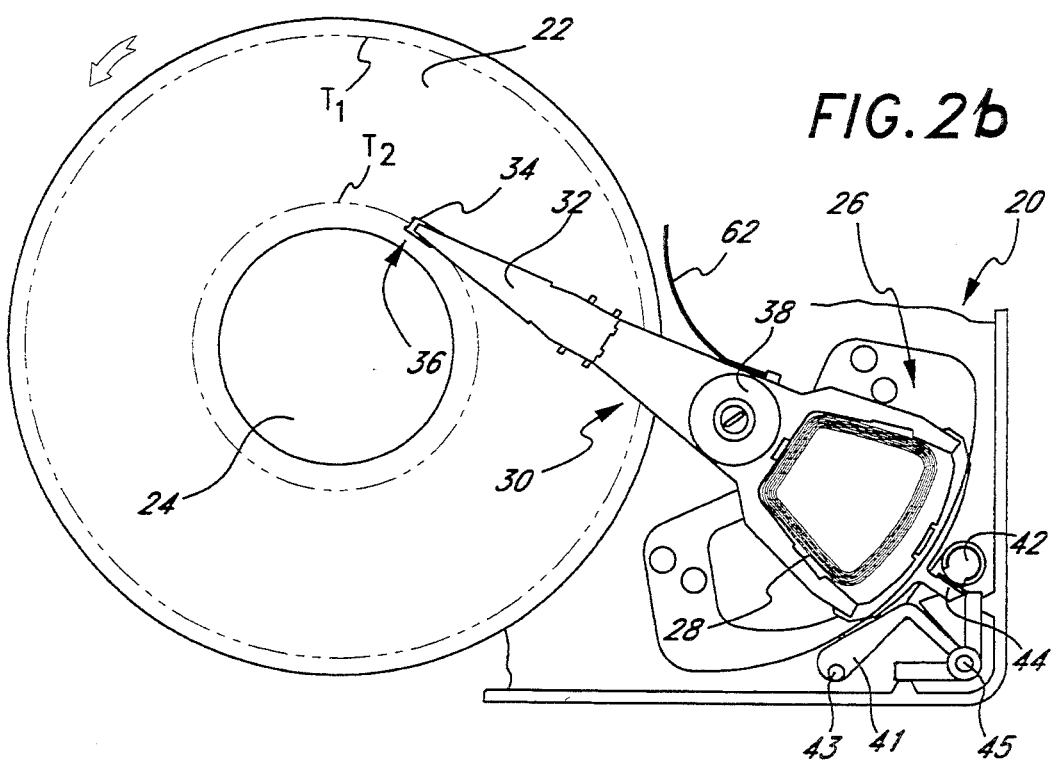
FIG. 2b is a plan view of the disk drive for showing an example of another rest state wherein a magnetic head and thus an actuator is positioned at an inner position of the disk for when it is not accessed.

Referring to FIGS. 2a and 2b, the operation of the disk drive is as follows. In FIG. 2a, the read/write head 36 on the load beam 32 is positioned on a track T1 at an outer side of the disk 22. In FIG. 2b, the position of the read/write head 36 is changed to an inner track T2 on the disk 22 by the operation of the disk drive 20 which drives the actuator assembly 26 based on instructions from the host computer. It is assumed that the read/write head 36 rests on the track T1 as in FIG. 2a, which was the track accessed in the previous read/write operation. It is also assumed that the disk drive 20 has been accessed within a predetermined period of time, and thus the spindle motor 90 and the actuator assembly 26 are not in a "sleep" state at the time when the new instruction is given to move to the read/write head 36 to the track T2.

A user of the host computer (for example, a laptop computer) sends instructions for reading from or writing data to the disks 22. Based on the instructions from the host computer, a disk drive electronics, i.e., an electronic circuit in the print circuit board (not shown) and the IC (in FIG. 1), sends signals through the flexible circuit 62 to stimulate the actuator motor (not shown) through the actuator coil 28. Since a current level for spindle motor drive is relatively large, the spindle motor assembly 24 (FIG. 3) is preferably energized through a different line (not shown). The spindle motor assembly 24 turns the disks 22 at high revolutions, such as 3,600 rpm, and the actuator motor moves the actuator arms 30 radially across the rapidly spinning disk.

As is well known in the art, this operation for positioning from one information sector in a track to the other information sector in the other track is performed by the servo mechanism which is basically a feedback control system. In the servo mechanism, predetermined signals including servo bursts are embedded on the surface of the disk 22, and by reading the servo bursts and other signals on the disk surface by the read/write head 36, drive current for actuator coil 28 is controlled to stop on the target sector in the track T2 of FIG. 2b.

An example of the structure of the spindle motor assembly 24 is shown in cross section in FIG. 3. The two aluminum data disks 22a, 22b are shown mounted over the spindle motor housing 90 by a disk clamping plate 128. The center of the clamping plate 128 affixes to the top of the spindle motor housing 90 with a screw 132. The peripheral edge of the plate 128 includes a downwardly bent circular elbow 130 which applies a downward force on the upper surface of the top disk 22a when the screw 132 is tightened due to the cantilevered plate configuration. The top disk 22a, in turn, sits on an annular disk spacer 117 supported by the bottom disk 22b. The disk spacer 117 is accurately machined to a height which allows the lower actuator arm (not shown) to move between the disks. The downward clamping force transmits through the bottom disk 22b to the annular flange 80 of the hub of the housing 90.

The spindle motor housing 90 also includes at its center a shaft 86 extending downwardly. Bearings 108, 110 provide a rotatable coupling between the shaft 86 of the spindle motor 90 and a hollow cylindrical flange 112 extending upwardly from a base 116. An annular magnet 98 bonds to the interior of the spindle motor housing 90 to rotate in proximity around a stator 100, which forms a spindle motor coil, similarly bonded to the exterior surface of the base flange 112 providing the electromagnetic drive means. When electrical currents flow through the stator 100, the spindle motor housing 90 rotates on the base 116, since the base 116 is fixed to the disk drive housing 20. (Note: as used herein, because the spindle motor housing 90 is the rotational element of the spindle motor assembly 24, the spindle motor housing 90 will also be referred to as the spindle motor 90.)

The further details of the spindle motor, i.e., its structure of each component, material of the components, and the procedure of assembly, etc., are provided in the U.S. patent application Ser. No. 974,986, entitled "DISK DRIVE SPINDLE MOTOR", and filed Nov. 12, 1992 by the same assignee of the present invention.

Reduction of Power Consumption and Peak Driving Current

As mentioned above, in the small form factor disk drives, it is important to minimize an electric power consumption since the portable computers such as the laptop computers are typically battery-powered and it is desirable to reduce battery drain. Namely, because of the reduction of the power consumption in the computers to facilitate the battery operation and the requirements of carrying the computer anywhere without a commercial power source or power outlets, it is extremely important that the power dissipation in the disk drives be decreased so that the computers can be operable for a longer period time by relatively small batteries.

In such a disk drive, major parts of the drive that dissipate most of the electric power are, a spindle motor for rotating the disk in high speed, an actuator drive for driving the magnetic heads to the designated position on the disk for reading and writing data, and a disk drive electronics (i.e., an electronic circuit) for controlling the operation of the disk drive. The features of the present invention reside in reduction of the power consumption and the peak driving current in the disk drives by controlling the amount of drive currents for the actuator and the spindle motor, respectively.

In this invention, the drive current for the actuator assembly is determined with respect to an access time in the actuator assembly when the disk in spinning. The drive current for the spindle motor is determined with respect to the smallest current which can overcome a resistance caused by sticktion in the spindle motor assembly such as friction between the surface of the magnetic disk and the read/write head. This is because the spindle motor is usually in a non-rotation state (rest) if the disk is not accessed for a period longer than the predetermined time length.

The access time is a time required for the disk drive to start performing the read/write operation after receiving the instructions from the host computer. The access time includes a seek time which is a time required for the magnetic head change position from one to another on the magnetic disk, and the spindle motor starting time which is a time required for the spindle motor to start rotation and reach to the rated rotation speed. It is sometimes important in such disk drives to reduce the transient time (settling time) required for the spindle motor starting from the non-rotation state to reach to the predetermined rotation speed. Because ON/OFF of the spindle motor is less frequent, the reduction of the spindle motor settling time is less important than that of the access time. Furthermore, because the spindle motor settling time may be a thousand times more than the access time, possible reduction of the spindle motor will not make an improvement of an overall performance of the disk drive. Thus, in driving the spindle motor, the present invention is intended to reduce the peak drive current even though such reduction causes a longer settling time.

The access time of the read/write head 36 and the transient time of the steady state rotation rate in the spindle motor 90 mainly based on the mechanical operation of the actuator assembly 26 and the spindle motor 90. The speed of the actuator 26 and the spindle motor 90 also depend on the drive currents provided thereto. Therefore, in general, the more the initial drive currents provided to the actuator and spindle motor, the faster the actuator and the spindle motor operate and thus it becomes shorter the access time and the transient time. When larger drive currents flow, the electric power consumption increases accordingly, and thus decrease the battery life.

Reduction of peak drive current is effective in increasing the battery life. In this invention, according to the program, the disk drive seeks the smallest drive current for the spindle motor which is large enough to initiate rotation in the spindle motor. The sticktion is a resistance in the disk drive system caused for example by the friction between the surface of the disk and the read/write head. The amount of sticktion varies depending on the time, environmental change such as humidity, and wear-out in the disk drive. Therefore, in the present invention, the program can automatically select the smallest current which can overcome the sticktion in a varied environment of the disk drive. This approach will increase the time required for the spindle motor to be settled in the rated rotation rate, the reduction of the driving current is considered to be more important in this invention rather than the settling time. This is because the settling time of the spindle motor is about thousand times larger than the access time of the actuator drive, and thus, the reduction of the settling time in the spindle motor does not make much improvements in the speed of the disk drive.

Current Control by Access Time Setting

Figure 4:
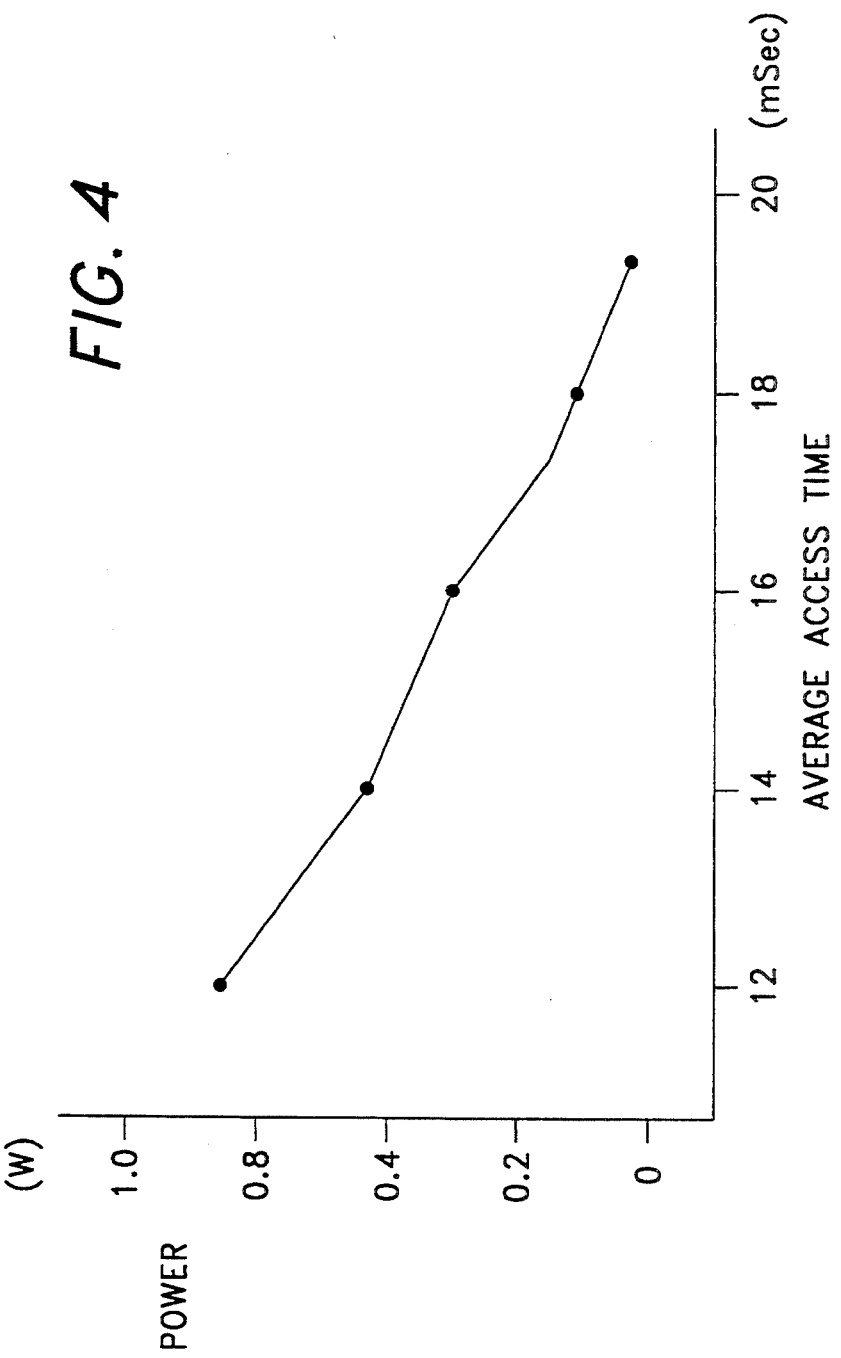
FIG. 4 is a chart showing a relationship between power consumption in an actuator and a access time for the actuator to access on a surface of a disk.

FIG. 4 shows an example of power consumption versus access time in an actuator operation in a disk drive. Similar characteristics can be obtained for power consumption versus spindle motor transient time. In FIG. 4, the average access time decreases when the drive current increases (i.e., the power consumption increases). The average access time increases when power consumption decreases. The present invention provides a disk drive circuit and method which is able to meet the needs of the user so that the user can set, depending on his purpose, an optimum range of the access time and transient time versus power consumption.

As described above, the reduced power requirements of the small form factor disk drives used in portable computer creates a situation where the access times are increased to reduce the power consumption or the power consumption is increased in order to decrease the access times. The prior art disk drives specify fixed performance regarding the access time and power consumption parameters. Namely, in the prior art, it is not possible to select the power consumption parameters versus access times. Therefore, even in a case where the user of the portable computer dose not need to use the shortest possible access time but rather wants to save battery energy with longer access time, the conventional disk drives cannot do so since the conventional disk drives is not able to flexibly set such parameters.

In this invention, a disk drive circuit and method is provided to allow the user to adopt the performance (access time) versus power consumption to meet the system requirements, which is called a power saving access time. The advantage of the user selectable access time is that the user is now provided with a means to control the battery life of the computer. Power consumption in a laptop computer is proportional to the access time of the hard disk. The faster the access time, the more power the actuator coils consume. Therefore, the essential feature of the present invention resides in freely optimizing the access time versus power consumption by making a compromise with the relationship between the two. There are at least two different ways to achieve the power saving access time. One is a process using a vendor unique command, and the other is a process using a seek command.

The power saving access time (PSAT) vendor unique command is implemented to permit the user to specify a predetermined access time from a plurality of possible access times (for example, 16 kinds of access times which can be arbitrary selected) for the driver electronics to operate upon. Namely, the plurality of access times with respect to the speed or power consumption are pre-programmed in a micro-controller unit and a memory and, if necessary, a register in a disk drive. The pre-programming is performed by a manufacturer of the disk drives in firmware prior to the shipment of the disk drive for installment in the computers. For the shorter access time, the corresponding larger drive current is defined in the program and, conversely, for the longer access time the corresponding smaller drive current is defined in the program.

In the vendor unique command of the present invention, the access time and thus the drive current for the actuator assembly 26 is determined by the user from the list of the plurality of parameters defined by the manufacturer of the disk drives. The user can change the access time if the present access time does not fit the user's purpose of using the disk drive in terms of access time and power consumption relationship. Usually, the specific amount of the access time so defined by the manufacturer is not recognizable for the user of the host computer. However, the user of the computer can get a general idea regarding the ranges of the access times from the documents of the disk drives provided from the disk drive vendors and select one of the access time defined in the program.

Even where the user does not have any knowledge regarding the suitable access time versus power consumption, the user can arbitrarily request the access time. The requested access time is range checked by the vendor unique command program. The acceptable ranges are determined by the conditions including a minimum required current level which can overcome a static resistance of the actuator assembly for changing positions, and the maximum current level which will not cause a harmful spike current for the batteries. If the requested access time is inappropriate (i.e., not within an acceptable range defined by the manufacture), the requested access time is rejected, and as a result, the access time is unchanged from the previous access time until an appropriate access time is specified by the user. The user again inputs another access time to see whether the access time is acceptable in the vendor unique command program and repeats this procedure until an acceptable access time is provided by the user to the disk drive.

In the vendor unique command, every time the acceptable access time is selected, the information on the new access time for actuator assembly 26 is stored in a drive configuration table on the disk 22. The drive configuration table is a table for information allocated in a predefined location on the disk 22 for storing the information required for the operation of the disk drive. Thus, unlike the read/write data, the drive configuration table is a memory area not accessible by the user. Based on the information in the drive configuration table, a gain of a current controller (i.e., a limit level of the current limiter) for providing a drive current to the actuator assembly 26 (FIG. 1) is determined based on a seek profile to effect the new access time specified. The seek profile is, for example, a set of procedures (sub-routines) for determining the associated drive current (gain of the current limiter) for the access time specified by the user.

Since, as well known in the art, the disk 22 is a non-volatile type memory, the access time specification needs to be performed only once, and the disk drive will remember the specified access time even across power cycles until it is altered again. Namely, under the vendor unique command, the disk drive remembers the last setting of the access time before the power switch of the computer is turned off, and automatically sets the last access time when the power of the computer is switched on. On subsequent power up cycles, the disk firmware obtains the access time request stored in the drive configuration table and adjusts the seek profile gain during the drive initialization process, and thus the access time last used is retained.

The other way of achieving the power saving access time in the present invention is accomplished through the use of the seek command. The seek command is a set of command signals defined by an industry standard of the computer and related peripherals industry. The seek command is formed, for example, of a hexadecimal, a number having a lower nibble (four bits). The power saving access time under the seek command of the present invention is to make use of the lower nibble of the standard seek command since the lower nibble of the regular seek command is "don't care". Since the 4 (four) bits in the lower nibble are not specifically used in the standard seek command format, the 4 bits are used to specify the access time. One of the advantages of specifying the access time through the seek command is that the seek command is a set of standardized format command signals and thus, by using the last 4 bits in the seek command to specify the access time, the user can input the access time in one step. On the other hand, in the vendor unique command, the user needs to key in the instruction in more than two steps, i.e., a request for changing the access time and a new access time.

In the power saving access time under the seek command of the present invention, the specified access is not stored in the drive configuration table on the disk 22, which means that the disk drive will not remember the access time across the power cycle or a reset cycle in the hardware/software of the host computer. Therefore, this method is used to alter the disk drive's current access time for this session only but not across the power on and off cycle in the computer.

Upon the receipt of the seek command, the requested access time is verified so that the request is acceptable (within the range defined in the program). This verification procedure is preferably the same as that of the vendor unique command process described above. An inappropriate request will not be accepted and the disk drive retains the last access time. The disk drive firmware will act on the legal (acceptable) access time request by adjusting the gain of the seek profile (amount of drive current in the current limiter) accordingly. This gain adjustment procedure is preferably the same as that in the vendor unique command wherein the seek profile sub-routine is activated.

Spindle Motor Drive Current Control

Similar to the actuator drive current control by the access time, reduction of peak drive current is effective in increasing the battery life. In the disk drive of this kind, when the magnetic disk is not accessed for a period longer than the predetermined time length, the drive current is not provided to the spindle motor to save the energy (sometimes referred to "sleep mode" or "standby mode"). Therefore, in such a case, the spindle motor is in a non-rotation state. To drive the spindle motor which has been in the non-rotation state, it is usually necessary to provide a relatively large start up current to start rotation in the spindle motor. Such a large peak start up current will adversely affect the battery life.

In this invention, according to the program, the disk drive automatically selects the smallest drive current for the spindle motor which is large enough to overcome the sticktion and initiate rotation in the spindle motor of the disk drive.

Figure 5:
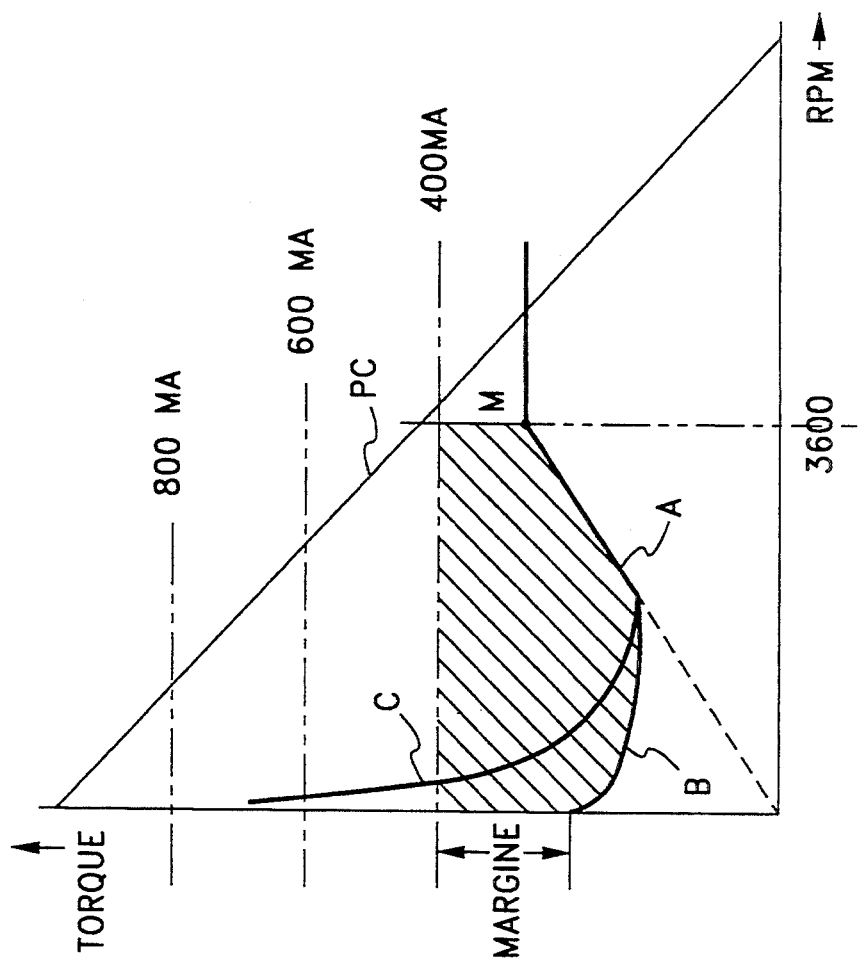
FIG. 5 is chart showing a relationship between driving currents for a spindle motor, rotation rates of the spindle motor, torque of the spindle motor.

FIG. 5 is a chart showing a relationship between drive currents (start up currents) for a spindle motor, rotation rates, and torque level (sticktion level in the disk drive) of the spindle motor. If no sticktion exists in the disk drive when the spindle motor is in rest, the spindle motor starts rotation by a minimum amount of drive current (with torque slightly higher than zero) as shown by the dotted line in FIG. 5. In an actual disk drive, however, there always exists a frictional force, both static and dynamic, against the rotation of the spindle motor. Thus, the disk drive is required to provide a start up current so that the spindle motor can generate the torque which is greater than the friction force or sticktion as shown in lines B and C in FIG. 5.

The sticktion is a resistance in the spindle motor which includes the static resistance at speed 0 (zero) which comprises, for example, the read/write head media sticktion to the surface of the disk and the frictional static torque of the bearings in the spindle motor. The resistance in the spindle motor system also includes a dynamic resistance which is speed sensitive. The major elements comprising the dynamic resistance are read/write head media drag friction until an air bearing is developed during the start up, mass moment of inertia in the spindle motor which is seen only under start up, friction based on the bearings rolling and lubrication, and disk surface resistance in air influenced by speed, temperature and air properties.

As in the lines B and C, once the spindle motor overcomes the static resistance, the overall resistance will usually considerably decrease. Then, the spindle motor increases its rotation speed linearly as indicated by a line A in FIG. 5. The line B indicates a typical example of sticktion characteristics, such as 0.4 inch-ounce, in the spindle motor and its associated mechanism. In this case, the drive current of 400 mA is large enough to activate the spindle motor. The shaded area shows a margin. The line C indicates an example of largest sticktion level, such as 1.5 inch-ounce, possible in the spindle motor. In such a case, the drive current of 800 mA can overcome the static resistance of the spindle motor. A power consumption line Pc is illustrated in FIG. 5 to show that the power consumption is proportional to the torque (and thus the drive current) of the spindle motor.

In this invention, a disk drive circuit and method is provided to allow the disk drive to automatically seek an optimum level of drive current for the spindle motor.

The advantage of the automatic drive current control is to reduce the peak current so that the battery can extend its life. Further, the automatic drive current control of the present invention can reduce the instantaneous power consumption in the spindle motor start up.

In one aspect of the present invention, for minimizing the start up current level and thus the power consumption in the spindle motor, the start up current for the spindle motor is controlled to a minimum value required to obtain rotation in the spindle motor. The minimum current required for the rotation is determined by the factors discussed above. The minimum current to be supplied to the spindle motor must be greater than the sum of the static resistance to start rotation and the dynamic resistance to increase the rotational speed. In other words, the sum of the highest resistance torques in the spindle motor system must be less than the sum of the lowest developed motor torque defined by the drive current at the same allowable operating speed. In this situation, the spindle motor gradually increases its rotational speed and eventually attains the target rotation rate after a relatively longer period of time after the initiation of supplying the drive current to the spindle motor. The settling time in this setting (minimum drive current) is the longest although the instantaneous power consumption in the spindle motor is the lowest.

Conversely, in case where the unlimited current flows to the spindle motor, the shortest settling time will be possible while the instantaneous power consumption will become largest. Moreover, such a surge current (unlimited current flow) will shorten the life of batteries, since the dry cell batteries are sensitive to the current spike. Therefore, it is advantageous to limit the drive current within a certain range, for example, 200 milliampere (mA) to 1000 mA in 200 mA steps for a nominal spindle motor. In the above example, a 200 mA drive current is the minimum current which will slightly overcome the total static and dynamic resistance of the spindle motor system for rotation, and a 1000 mA drive current is the maximum current to sufficiently drive the spindle motor with a reasonably shortest time but is not as large as the spike current which adversely affects the batteries.

An example of a current control scheme by dynamically changing the drive currents within the predetermined range to the spindle motor is as follows. In this example, a spindle motor driving current ranging from 400 mA to 800 mA with a 200 mA step is used for starting the spindle motor. The range of driving current is selected based on the possible level of sticktion which is variable depending on time, environmental change such as humidity and temperature, abrasion in the disk mechanism and etc. In a newly made disk drive, the sticktion level is relatively low, i.e., typically 0.4 inch-ounce, which is easily overcome by a 400 mA driving current. The sticktion will increase for the longer used disk drive to a maximum level of typically 1.5 inch-ounce, which requires an 800 mA driving current for starting the rotation of the spindle motor.

In this invention, when the controller 144 in the disk drive sends an instruction to rotate the spindle motor, the automatic drive current control first reads the start up current used in the last operation from the drive configuration table. If the last start up current is the minimum current level (400 mA), the same start up current is used for the present operation. The rotation rate of the spindle motor is checked as the spindle motor is accelerated to reach to the required rotation speed. If the last start up current is larger than 400 mA, the disk drive tries to use the start up current which is smaller than the last current by 200 mA by an adaptive start procedure. In case the start up current is not large enough to drive the spindle motor into suitable rotation rate, the disk drive automatically seeks the next large drive current, i.e., 600 mA and if it is still not sufficient, then the largest drive current, i.e., 800 mA.

In this way, the disk drive of the present invention seeks the lowest possible drive current level to overcome the sticktion in the spindle motor. The adaptive start in the present invention which tries to use one step smaller current than the last current in case the last current is not minimum is effective since the resistance caused by the sticktion depends in part on the length of time the spindle motor has been in the non-rotation state. Therefore, if the spindle motor has been activated in a short time before, such as few minutes, then the spindle motor friction may be relatively small and the rotation will start by the smaller drive current.

Electric Circuit Configuration

Figure 6:
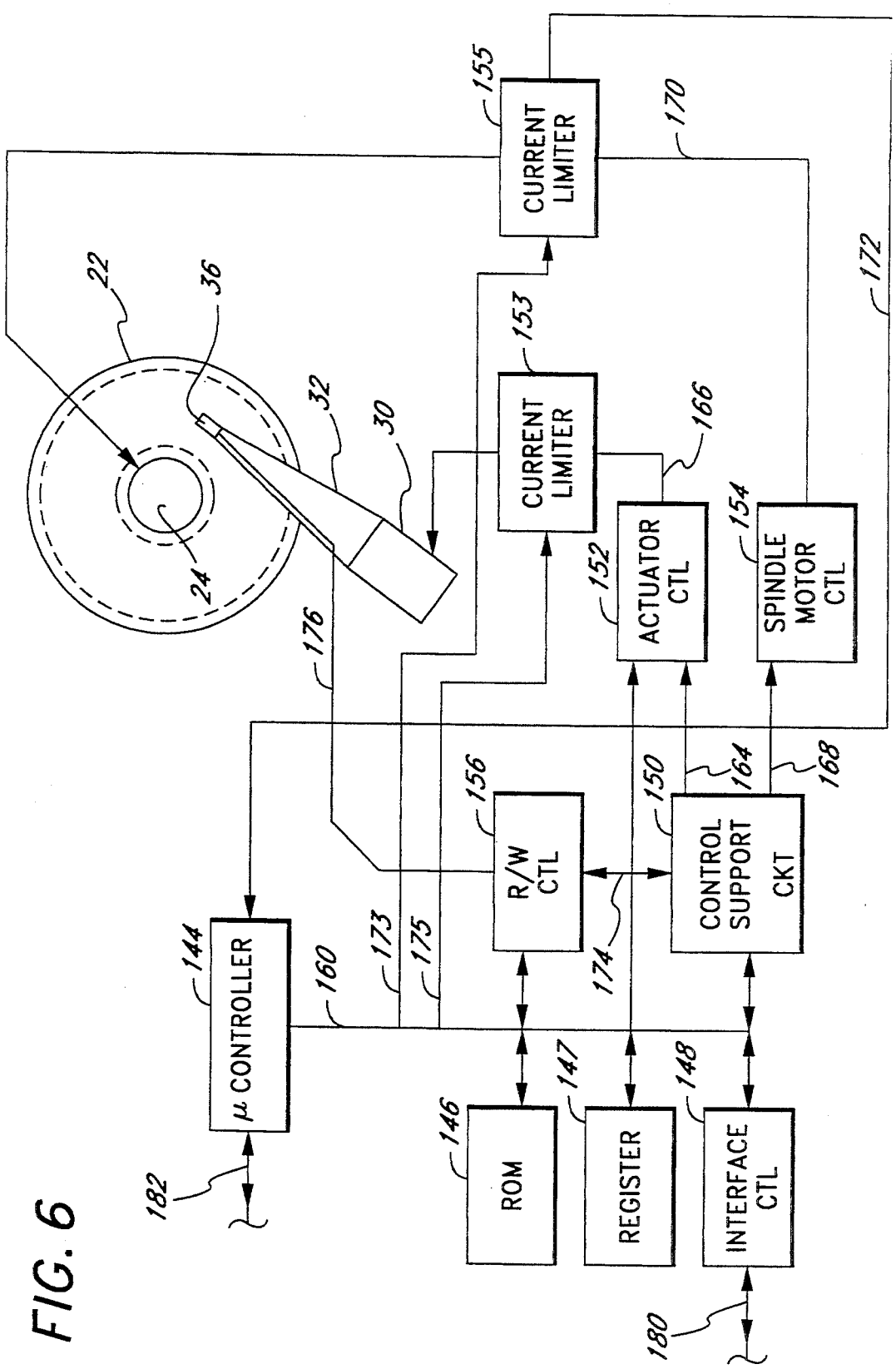
FIG. 6 is a block diagram of the electric circuit of the disk drive of the present invention.

FIG. 6 shows an example of electronic circuit configuration of the disk drive of the present invention. With reference to FIG. 6, a micro-controller 144 and a minimum number of dedicated control support circuits direct all functions of disk drive 20. In the preferred embodiments of the present invention, the micro-controller 144 can be any type of micro-controllers commercially available in the market, for example, a three megahertz clock rate Motorola MC68HC11 HCMOS single chip micro-controller. A read-only memory (ROM) 146 is coupled to the micro-controller 144 by way of a general purpose data, address and control bus 160. The ROM 146 is utilized to store a micro-controller control program for supporting principle tasks necessary to implement the full functionality of the disk drive 20. These tasks include an interface control with a host computer, an actuator drive control, a spindle motor drive control, a read/write control, and a monitor control, in addition to an access time versus power consumption control and a spindle motor current control in accordance with the present invention. A register 147 may preferably be provided to store information concerning, for example, the access time versus power consumption table as mentioned above, although such register can be replaced with the ROM 146 or an internal memory or register of the micro-controller 144.

An interface control circuit 148 is provided to support the micro-controller 144 in execution of the interface task with the host computer. A standardized interface control circuit is available in an integrated circuit form in the market such as a Cirrus Logic CL-SH250 Integrated SCSI Disk Controller. The interface controller 148, in general, provides a hardware interface between the disk drive 20 and the host computer system, via a communications bus 180. Thus, the interface controller 148 operates to manage bi-directional data streams between the communications bus 180 and the bus 160.

An actuator controller 152 and a current limiter 153 are provided as internal interfaces between the micro-controller 144 and the actuator assembly 26. The actuator controller 152 includes a digital-to-analog converter for converting a digital position control word to an analog voltage and supplies the resultant analog voltage to a line 166. The digital position control word, as provided via the bus 160 from the micro-controller 144, represents the desired actuator position. The current limiter 153 is provided with a digital current control word from the micro-controller 144 via a line 175. The control word on the line 175 determines an output current level to be supplied to the voice coil motor of the actuator assembly 26. The digital current control word is determined by the seek profile in the program of the present invention as will be described in more detail later. Further, more detail of the current limiter 153 and the seek profile will be described later. Enabling of the actuator controller 152 in general is provided via the control support circuit 150 via control lines 164. The control support circuit 150, to this end, acts as a parallel port expander for latching a control data word also provided by the micro-controller 144 via the bus 160.

A read/write controller 156 similarly acts as an internal interface between the bus 160 and the read/write heads of the actuator assembly 26 via the raw data lines 176. The read/write controller 156 functions to provide for the buffered serialization/deserialization and data clock encoding/decoding of data. Configuration and initiation of read/write controller 156 functions are performed under the direct control of the micro-controller 144 by the transfer of control and data words to the read/write controller 156 via the bus 160.

A spindle motor controller 154 is provided to supply the drive current of the spindle motor 24 via the current lines 170 and a Current limiter 155. Drive state selection is effected by a digital word from the micro-controller 144 to the control support circuit 150. This digital word is latched and provided on the line 168 to the spindle motor controller 154. The current limiter 155 is provided with a digital current control word from the micro-controller 144 via a line 173. The control word determines an output current level to be supplied to the spindle motor 24. The digital current control word is determined by the starting current control program of the present invention. The internal structure of the current limiter 155 is similar to the current limiter 153. The starting current control program will be described in more detail later. The spindle motor controller 154 provides the drive current to the current limiter 155 via line 170 so that the current limiter 155 dynamically changes the drive current level based on the instructions from the micro-controller 144.

Figure 7:
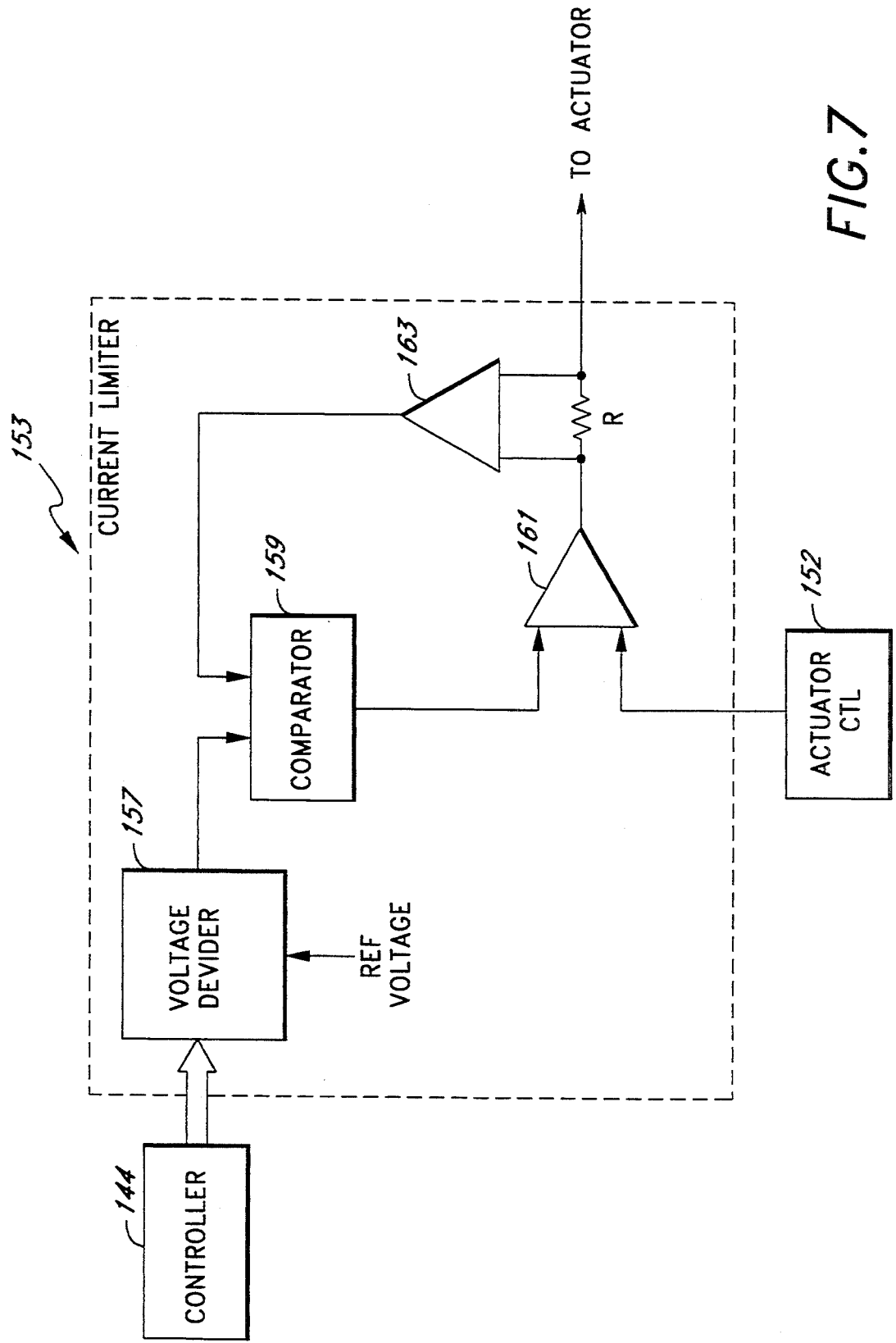
FIG. 7 is a block diagram for showing an example of electric circuit of the current controller of the present invention.

FIG. 7 shows a detailed block diagram of an example of the current controller 153 shown in FIG. 6 of the present invention. The current controller 155 of the present invention for generating the spindle motor drive current can also have the same structure. It should be noted that the circuit configuration in FIG. 7 is an exemplary purpose only and various other configurations are possible by a person skilled in the art in accordance with the spirit of the present invention. The current limiter 153 for driving the actuator assembly 26 comprises a voltage divider 157, a voltage comparator 159, a power amplifier 161 and a buffer 163. A series resistance R is connected to an output of the power amplifier 161 which supplies the drive current to the actuator assembly 26.

The voltage divider 157 is provided with the digital current control word from the micro-controller 144. The digital current control word defines the drive current level i.e., current limiter level (or gain) based on the procedure in the seek profile of the present invention. Namely, as described above with respect to the access time setting either by the vendor unique command or the seek command, the gain (i.e., the current level) for driving the actuator assembly 26 is determined by the seek profile based on the access time defined by the user. The voltage divider 157 divides a reference voltage V according to the digital current control word and outputs the resultant voltage to be supplied to the comparator 159.

The power amplifier 161 is provided with the analog voltage from the actuator controller 152. The analog voltage from the actuator controller 152 corresponds to the digital position control word which defines the position of the read/write head 36 on the disk 22. The other input terminal of the power amplifier 161 is connected with the output of the comparator 159. The power amplifier 161 supplies the drive current to the actuator assembly 26 through the resistance R. The buffer 163 detects the voltage drop across the resistance R which is indicative of the current amount to the actuator assembly 26 and provides the voltage drop to the comparator 159 for comparison with the control voltage. Therefore, the power amplifier 161, the buffer 163 and the comparator 159 constitute a negative feedback loop which controls the output current to the actuator assembly 26 according to the digital current control word from the micro-controller 144. In this configuration, the current limiters 153 and 155 can generate the actuator drive currents and the spindle motor drive currents, the amount of which are controlled by the signals from the micro-controller 144. For example, the spindle motor start up currents of 400 mA, 600 mA and 800 mA are selectively generated by the current limiter 155.

A switch S1 is provided to interchange the feedback loop having the comparator 159 and the feedback loop directly connected to the output of the buffer 163. In the latter feedback loop, the output current to the actuator is determined by the input signal from the actuator control 152 since the feedback loop works as an unity gain buffer. The switch S1 is controlled by the command signal from the micro-controller 114. Therefore, if the user does not want the current limit function (actuator power consumption control by access time, or automatic spindle motor current control) of the present invention, he can disable the current limiters 153 or 155 by activating the switch S1.

Flow Chart for Access Time v. Power Control

Figure 8:
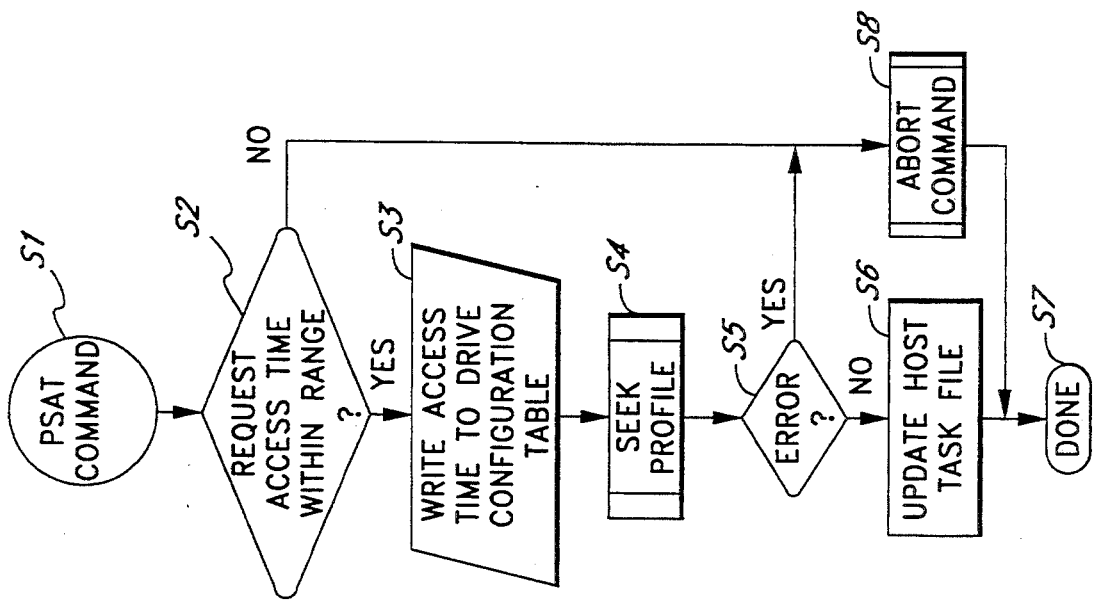
FIG. 8 is a schematic flowchart of the an operation of the disk drive control method of the present invention showing a sequence of reduction of power consumption based on a vendor unique command.

In the preferred embodiment of the present invention, the procedure of the invention (Power Saving Access Time (PSAT) command) is implemented by the micro-controller unit 144, the memory 146 and, if necessary, the register 147 of FIG. 6 (disk firmware). FIG. 8 is an exemplary flowchart of the overall operation of the vendor unique command of the present invention showing the sequence of setting the access time (and the resulting drive current) in the disk drive. In the vendor unique command of the present invention, the access time, and thus the drive current for the actuator assembly 26, is determined by the user from the list of the plurality of parameters defined by a manufacture of the disk drives.

In a first step S1, the operation of the vendor unique command is initiated by the user by, for example, requesting a new access time through the keyboard of the host computer. After the sequence start in the step S1, the operation proceeds to a step S2 wherein it is determined whether the requested access time is within the range prescribed in the program (access time versus power consumption list). Factors for determining the acceptable range are a minimum required current level which can overcome a static resistance of the actuator assembly for changing positions, and the maximum current level which will not cause a harmful spike current for the batteries. If the requested access time is not qualified (i.e., outside the acceptable ranges defined in the program by the manufacturer), the sequence moves to a step S8 wherein the requested access time is rejected and the procedure is terminated at a step S7. As a result, the access time is unchanged from the previous access time until an appropriate access time is specified by the user.

If the requested access time is acceptable (i.e., within the predetermined range defined by the manufacturer), the procedure continues at a step S3 wherein the requested access time is written in a drive configuration table in the hard disk 22. In the vendor unique command, every time the acceptable access time is selected, the information on the new access time for actuator assembly 26 is stored in the drive configuration table on the disk 22. The drive configuration table is a table for information allocated in each sector on the disk 22 for storing the information required for the operation of the disk drive. Thus, unlike the read/write data, the drive configuration table is a memory area not accessible for the user.

Based on the information in the drive configuration table, in a seek profile process of a step S4, a gain of a current controller (limit level of the current limiter) for providing a drive current to the actuator assembly 26 (FIG. 1) is determined to effectuate the new access time thus specified. The seek profile is, for example, a set of procedures (sub-routines) for determining the associated drive current (gain of the current limiter) for the access time specified by the user. In this seek profile, the controller 144 determines the reference voltage level in the current limiter 153 of FIG. 7 so that the current limiter 153 can generate the drive current defined by the reference voltage through the feedback loop as discussed with reference to FIG. 7.

If the drive current level is determined by the seek profile of the step S4, the operation moves to a step S5 wherein it is determined whether there is an error in the preceding procedures. If there is an error, the process moves to the step S8 which aborts the command by the user and terminates the process at the step S7. Therefore, in such a case, the user has to retry in selecting the access time from the step S1 again, if the user still wants to change the present access time versus power consumption relationship. If there is no error in the procedure, then the process continues to a step S6 wherein the task file in the host computer is updated to be ready for the next job. Thus, the process is completed in a step S7. After this procedure, the disk drive of the present invention remains the same access time versus power consumption definition until it is altered by the process shown in the flow chart of FIG. 8.

Figure 9:
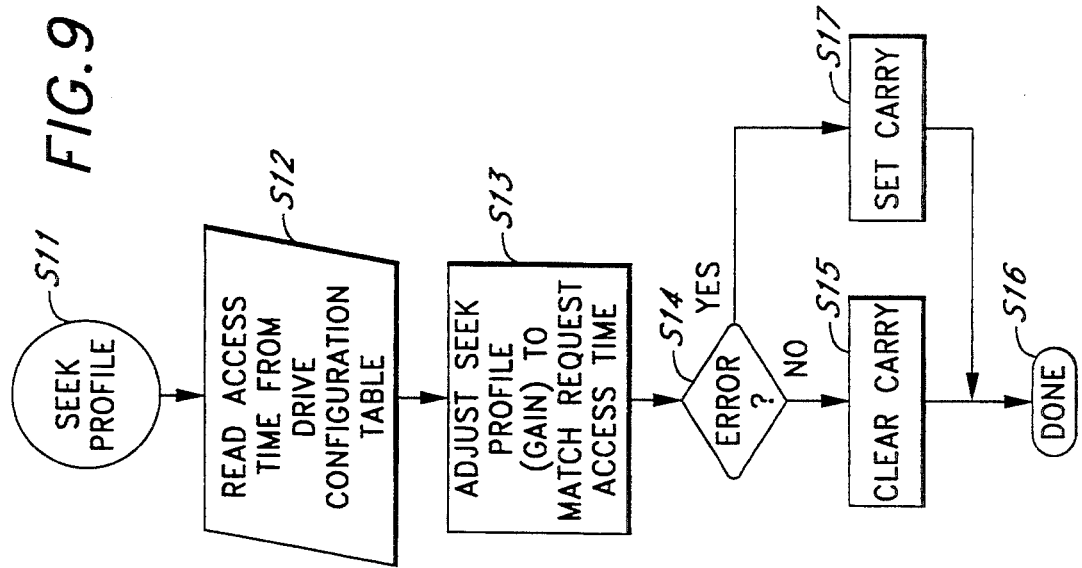
FIG. 9 is a schematic flowchart of the operation of the disk drive control method of the present invention showing a sequence of a seek profile sub-routine for verifying an access time defined by the process of FIG. 8 based on the vendor unique command.

FIG. 9 shows a detailed flow chart of the seek profile step S4 of FIG. 8. Since, as well known in the art, the magnetic disk 22 is a non-volatile type memory, the access time specification needs to be performed only once, and the disk drive will remember the specified access time even across power cycles until it is altered again. Namely, under the vendor unique command, the disk drive remembers the last setting of the access time before the power switch of the computer is turned off, and automatically sets the last access time when the power of the computer is switched on. On subsequent power up cycles, the disk firmware obtains the access time request stored in the drive configuration table and adjust the seek profile gain during the drive initialization process, and thus the access time last used is retained.

Referring to FIG. 9, the seek profile process starts at a step S11. Then the process proceeds to a step S12 wherein the access time stored in the drive configuration table on the disk is read. As described above, in the preferred embodiment, the read/write head of the disk drive senses the access time data from the drive configuration table in the predefined location in the disk. Alternatively, this step can be eliminated since the access time is given in the step S2 in FIG. 8. Based on the requested access time, the process moves to a step S13 wherein the drive current level (the gain, i.e., the reference voltage level, in the current limiter) is adjusted to match the requested access time. This adjustment is made by the access time versus power consumption table stored in micro-controller 144 or in the memory 146 or register 147.

After the adjustment of the current limit level, the process continues to a step S14 wherein it is determined whether there is any error in the process so far. If there is an error in the process (YES), the sequence moves to a step S17 wherein the process sets a carry (flag) to indicate an existence of the error and terminates the process at a step S16. If the answer is NO (no error), the process clears the carry at a step S15 and finalizes the seek profile procedure at the step S16.

FIG. 10 shows a process for adjusting the access time versus power consumption relationship based on the seek command of the present invention. As describe above, the other way of achieving the power saving access time in the present invention is accomplished through the use of the seek command. The seek command is a set of command signals defined by an industry standard of the computer and peripheral industry. The seek command comprises, for example, a hexadecimal number that includes a lower nibble (four bits), which, as discussed above, is not used.

In FIG. 10, the seek command process starts at a step S21 by keying the seek command signal by the user, for example, by requesting a new access time through the keyboard of the host computer. After the sequence start in the step S21, the process proceeds to a step S22 wherein the seek command data is read from a host command register (not shown). At a step S23, the lower 4 bits (which indicates the access time selected by the user) of the seek command is isolated to identify the access time defined by the user. The process moves to a step S24 wherein it is determined whether the requested access time is within the range prescribed in the program. This verification procedure is preferably the same as that of the vendor unique command process (the step S2 in FIG. 8) described above.

Factors for determining the acceptable range (outer limit) are preferably the same as discussed with respect to the vendor unique command of FIG. 8. An inappropriate request will not be accepted and the disk drive will retain the last saved access time. Therefore, if the requested access time is not acceptable (i.e., outside the acceptable range defined in the program by the manufacturer), the sequence moves to a step S28 wherein the process rejects the requested access time and terminates the seek command procedure at a step S27.

The disk drive firmware will act on a legal (acceptable) access time request by adjusting the gain in the seek profile process (amount of drive current in the current limiter) accordingly. This gain adjustment procedure is preferably the same as that in the vendor unique command wherein the seek profile sub-routine is activated. Therefore, if the requested access time is acceptable (i.e., within the predetermined range defined by the manufacturer), the procedure continues to a step S25 wherein the designated access time is converted to a corresponding drive current for the actuator assembly in the seek profile process which is identical to the step S4 in FIG. 8 and the detailed flow of FIG. 9. In the step 25, a gain of a current controller (current level of the current limiter) for providing a drive current to the actuator assembly 26 (FIG. 1) is determined to effectuate the new access time specified by the user.

If the drive current level is determined by the seek profile of the step S25, the process moves to a step S26 wherein it is determined whether there is an error in the preceding procedures. If there is an error, the process moves to the step S28 which aborts the seek command by the user and terminates the process at the step S27. Therefore, in such a case, the user has to retry entering the access time from the step S21 again if the user still wants to change the present access time versus power consumption relationship. If there is no error in the procedure, the process forwards to the step S27 wherein the seek command procedure is completed. After this procedure, the disk drive of the present invention retains the same access time versus power consumption definition until it is altered.

As described in the foregoing, in the power saving access time under the seek command of the present invention, the specified access time is not stored in the drive configuration table on the disk 22. This means that the disk drive will not remember the access time across the power cycle or a reset cycle in hardware/software of the host computer. Therefore, this method is used to alter the disk drive's current access time for this session only but not across the power on and off cycle or the reset on and off in the computer. The advantage of the seek command is that it can change the access time versus power consumption relationship by a single step of input in the host computer by the user as mentioned above.

FIG. 11 shows a flow chart of a process that recalls the access time used in the previous session before the power off or the reset cycle of the host computer in the vendor unique command of FIG. 8. As mentioned above, in the vendor unique command, the information on the access time is stored in the drive configuration table on the magnetic disk 22. The data in the magnetic disk 22 remains even though an electric power is not provided. Thus, in the session after the power off, the disk drive of the present invention automatically retrieves the previous data regarding the access time from the disk and determines the drive current level for the actuator.

At a step S31 in FIG. 11, the host computer is powered on or reset so that the computer system becomes active. At this stage, the previous access time will be retrieved from the drive configuration table automatically by the controller based on the program. Namely, in a step S32, the read/write head 36 reads out the effective access time stored in the drive configuration table in the predetermined location in the disk.

After obtaining the access time data from the drive configuration table, the process moves to a step S33 wherein the drive current level (current level in the current limiter 153) is determined by the seek profile process. This seek profile is the same as the step S4 in FIG. 8 or the S25 in FIG. 10 as described above. After the current level is determined and it is determined that there is no error in the process seek profile process as in the step S5 of FIG. 8, then the process ends at a step S34 where the disk drive is ready for receiving the next command.

Flow Chart for Spindle Motor Current Control

Figure 12:
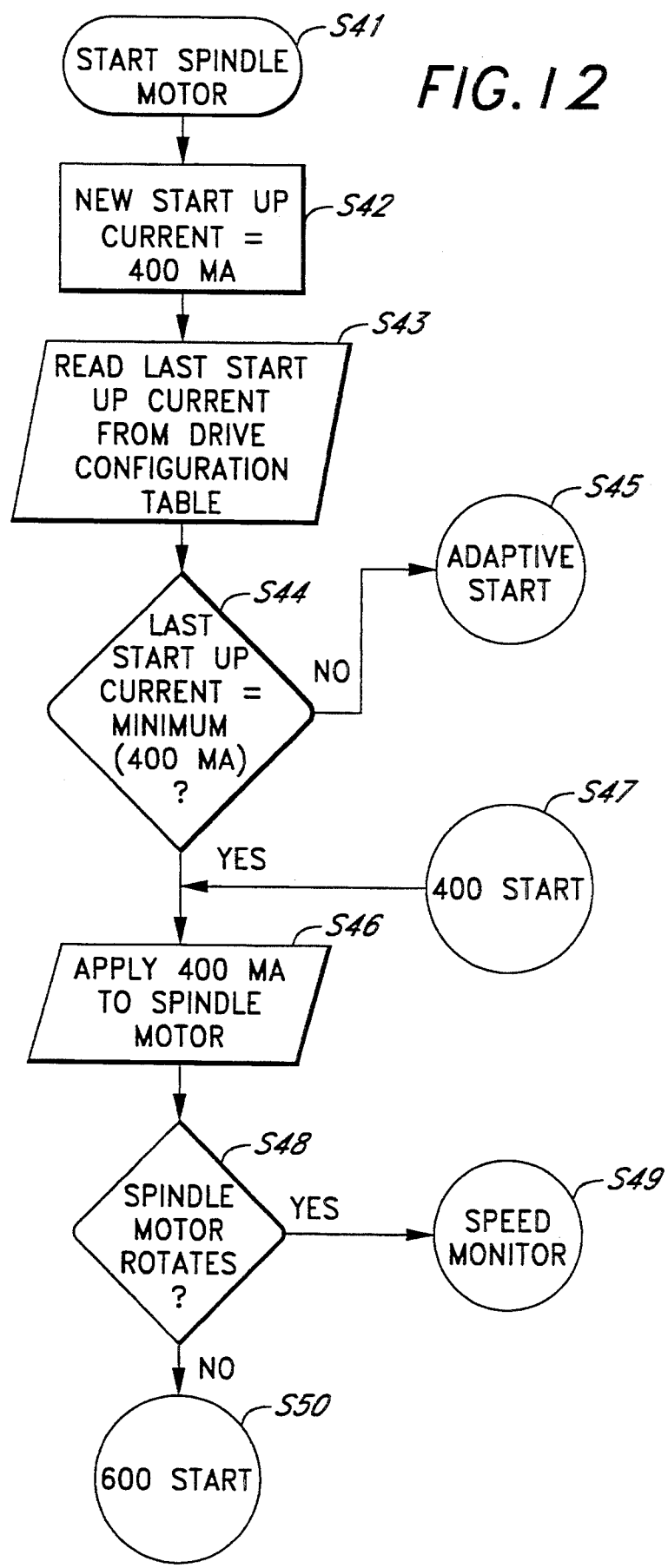
FIG. 12 is a schematic flowchart of the an operation of the disk drive control method of the present invention showing a sequence of reduction of a starting current for a spindle motor by mainly the lowest drive current of 400 mA.
Figure 13:
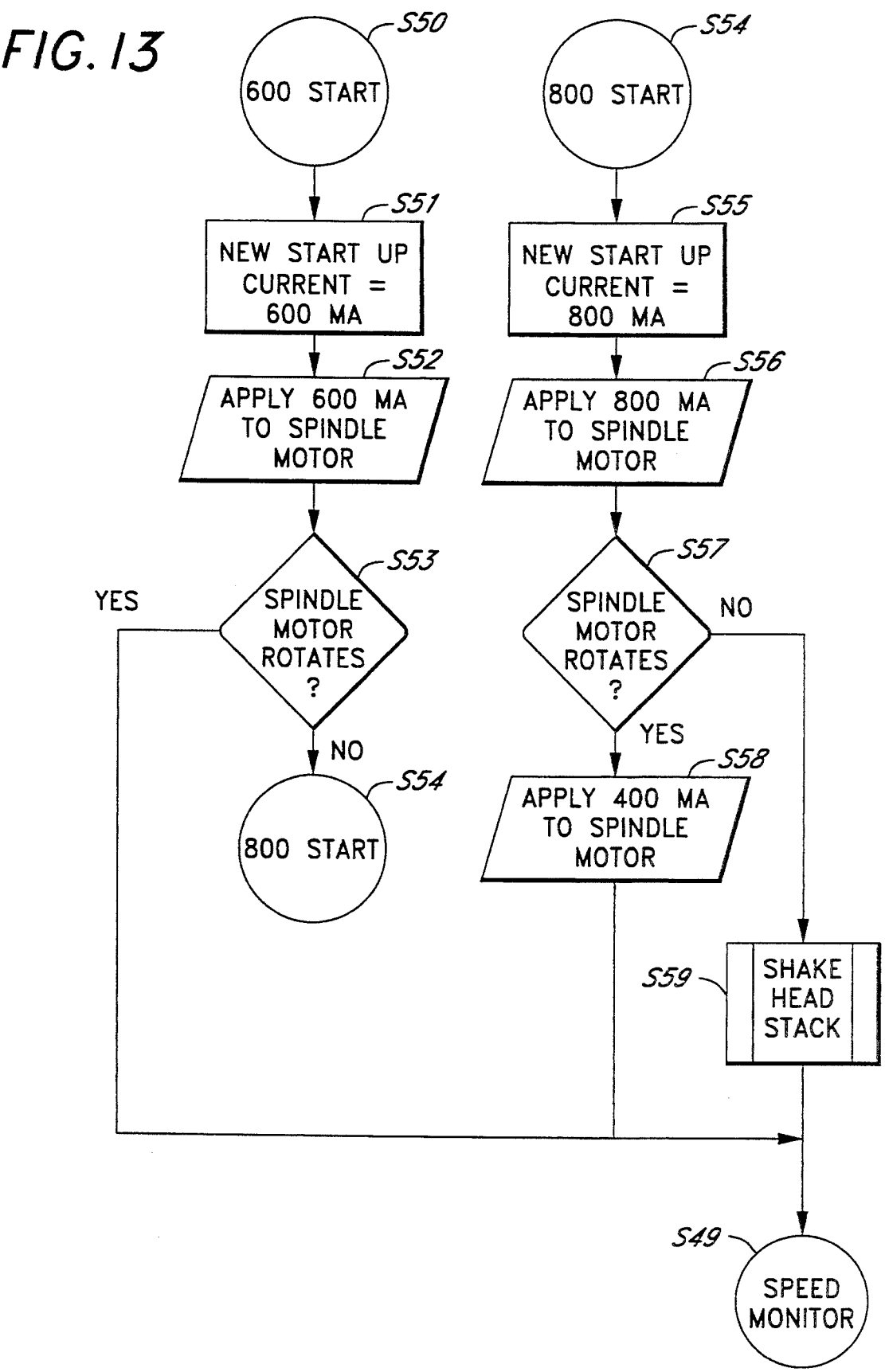
FIG. 13 is a schematic flowchart of the an operation of the disk drive control method of the present invention showing a sequence of reduction of a starting current for a spindle motor by mainly the drive currents of 600 mA and 800 mA.

FIGS. 12 and 13 show an overall flow chart for automatic control of the spindle motor drive current in the disk drive of the present invention. In this example, the disk drive automatically seeks optimum level of currents to meet the requirements of driving the spindle motor and reducing the power consumption. Namely, the optimum currents have to be large enough to activate the spindle motor to start rotation by overcoming the resistance caused by the sticktion. At the same time, the optimum currents have to be small enough so as not to consume excessive power in the spindle motor.

In the preferred embodiment, the drive currents are limited to 400 mA, 600 mA and 800 mA depending on the resistance level associated with the spindle motor. Normally, the lowest drive current, 400 mA is automatically selected by the program. If the lowest drive current is not large enough to overcome the resistance by the sticktion in the disk drive, the program seeks the next higher drive current, 600 mA. If the drive current is still not large enough, then the largest drive current, 800 mA is selected to start in the spindle motor. After the spindle motor starts rotation, usually the sticktion level lowers as discussed with respect to FIG. 5. Thus, the drive current level is automatically lowered to the level which is large enough to maintain and increase the rotation rate so that the spindle motor reaches its predetermined rotation rate, for example, 3,600 rpm.

In FIG. 12, the procedure for the spindle motor rotation is initiated at a step S41 or by a power on cycle, wherein the host computer provides a command signal to the disk drive through the interface bus 182 in FIG. 6 to activate the spindle motor which is in either "sleep mode" or "standby mode". In either mode, a drive current is not provided to the spindle motor so that the motor is rested (non-rotation state) to save energy. After the command signal is given to the disk drive, the procedure moves to a step S42 wherein a new start up current is set in the micro-controller 144. In this example, the new start up current of 400 mA is set in the controller 144 so that the spindle motor is first drive by the lowest possible drive current.

In a step S43, the read/write head 36 reads the last start up current from a drive configuration table on the magnetic disk 22. In the spindle motor current control procedure of the present invention, every time the spindle motor start command is provided, the procedure seeks the start up current used immediately before the start up operation of the spindle motor. The purpose of reading out the previous start up current is to accommodate the drive current level fit to the recent condition of the spindle motor. As described above, the resistance level in the spindle motor varies depending on the time, the environmental change such as temperature and humidity, and the degree of wear out. Thus, drive currents of different levels are required for the conditions in the disk drive. Therefore, in the present invention, the procedure reads out the most recent data on the start up current from drive configuration table on the disk.

The process continues at a step S44 wherein it is determined whether the last start up current thus read out in the step S43 is the minimum current, i.e, 400 mA. If the test result is negative, then the process moves to a step S45 wherein an adaptive start procedure will take place. The adaptive start is a process for setting a new start up current which is smaller by 200 mA than the last start up current when the last start up current is not the minimum current 400 mA. The process for the adaptive start is described in more detail with respect to FIG. 14.

If the result in the step S44 is affirmative, i.e., the last start up current is 400 mA, the process proceeds to a step S46 wherein the disk drive applies the 400 mA drive current to the spindle motor. This setting of the drive current is made by supplying an instruction signal (to set the reference voltage for the feedback loop in FIG. 7) from the micro-controller 144 to the current limiter 155 to adjust the output current limit to 400 mA. The step S46 is also activated by a step S47 which is a step for 400 mA start. The step S47 is connected to the flow chart showing the adaptive start process of FIG. 15 which will be described in detail later.

After providing the drive current 400 mA to the spindle motor, the process continues at a step S48 wherein it is determined whether the spindle motor rotates or not. If the spindle motor will not rotate, the flow is forwarded to a step S50 wherein a procedure for applying the spindle motor starting current of 600 mA starts. If the spindle motor rotates, the process moves to a step S49 wherein the rotation speed of the spindle motor is monitored. In this step S49, the rotation speed is measured to maintain the predetermined ration rate, for example 3,600 rpm, which will be describe in more detail later. The step S49 is also initiated by steps shown in FIG. 13. Namely, the step S49 for monitoring the rotation rate is initiated every time the spindle motor rotates by 400 mA or other levels of drive currents, i.e., 600 mA and 800 mA, as will be described in more detail later with respect to FIG. 13.

FIG. 13 shows a flow chart of procedure for the 600 mA start current and the 800 mA start current. The flow chart of FIG. 13 can be connected to the step S49 of flow chart of FIG. 12 wherein the rotation speed of the spindle motor is monitored, since the flow chart of FIG. 13 includes the same connection point S49. As described above with respect to the flow chart of FIG. 12, the procedure of the spindle motor current control of the present invention first tries to drive the spindle motor by the smallest start current, i.e., 400 mA in this example. If the spindle motor will not rotate, then the procedure seeks and provides the next higher start current, 600 mA, to the spindle motor. If the spindle motor still does not rotate, the highest start up current, 800 mA is provided to the spindle motor., FIG. 13 shows this procedure of providing the 600 mA or 800 mA start up current to the spindle motor when the 400 mA start up current is not sufficient to drive the spindle motor.

In FIG. 13, at the step 50, which is also shown in the bottom of FIG. 12, the procedure of driving the spindle motor by the 600 mA start up current begins. In a step S51, the new start up current 600 mA is set in the micro-controller 144 of FIG. 6 so that the micro-controller 144 can provides the necessary command signals to the other parts of the disk drive for furtherance of the procedure. By the instructions from the micro-controller 144, the procedure advances to a step S52 wherein the current limiter 155 applies the 600 mA drive current to the spindle motor 24. As described above with respect to FIGS. 6 and 7, this current limiting is set, for example, by providing the control signal from the controller 144 to the current limiter 155 to change the divide ratio of the reference voltage to be applied to the comparator in the feed-back loop as shown in FIG. 7.

After the 600 mA start up current is given to the spindle motor, the process moves to a step S53 wherein it is determined Whether the spindle motor 24 rotates. If the spindle motor rotates, then the procedure advances to the step S49 wherein the rotation speed of the spindle motor is measured by a process shown in more detail in FIG. 15. If the spindle motor will not rotate, the procedure moves to a step S54 wherein the procedure of providing the 800 mA drive current is initiated.

At the step 54 shown at the top right of FIG. 13, which is also shown in the bottom left of FIG. 13, the procedure of driving the spindle motor by the 800 mA start up current begins. In this example, the 800 mA start up current is the largest current which is supposed to overcome the possible highest resistance caused by the sticktion in the spindle motor and its associated mechanism. In a step S55, the new start up current 800 mA is set in the micro-controller 144 of FIG. 6 so that the micro-controller 144 can provides the necessary command signals to the other parts of the disk drive for effectuating the procedure follows. By the instructions from the micro-controller 144, the procedure advances to a step S56 wherein the current level is changed to 800 mA and the current limiter 155 applies the 800 mA drive current to the spindle motor.

After the 800 mA start up current is given to the spindle motor, the process moves to a step S57 wherein it is determined whether the spindle motor rotates. If the spindle motor rotates, then the process proceeds to a step S58 wherein the drive current is reduced to 400 mA, in this example, to maintain and accelerate the rotation in the spindle motor. This is because the resistance of sticktion will be considerably decreased once the spindle motor starts rotation as described with respect to FIG. 5, and thus even the lowest current level of 400 mA is usually sufficient to maintain and accelerate the rotation. In this regard, although not shown in the flow of providing the 600 mA start up current, it is possible to insert an additional step similar to the step S58 to reduce the drive current to 400 mA between the step S53 and the step S49 of FIG. 12 once the spindle motor successfully starts rotation by the 600 mA start up current.

After the step S58 the process moves to the step S49 wherein the rotation speed of the spindle motor is monitored by the process of FIG. 15 which will be described in more detail later. If the spindle motor will not rotate, the procedure moves to a step S59 wherein the disk drive tries to reduce the sticktion by, for example, shaking the read/write head 36. It is usually sufficient to provides some mechanical stimulus, such as the vibration to overcome the sticktion in the spindle motor and its associated mechanism to kick-in the spindle motor. Once the spindle motor starts rotation, the procedure moves to the step S49 to monitor the rotation speed.

Figure 14:
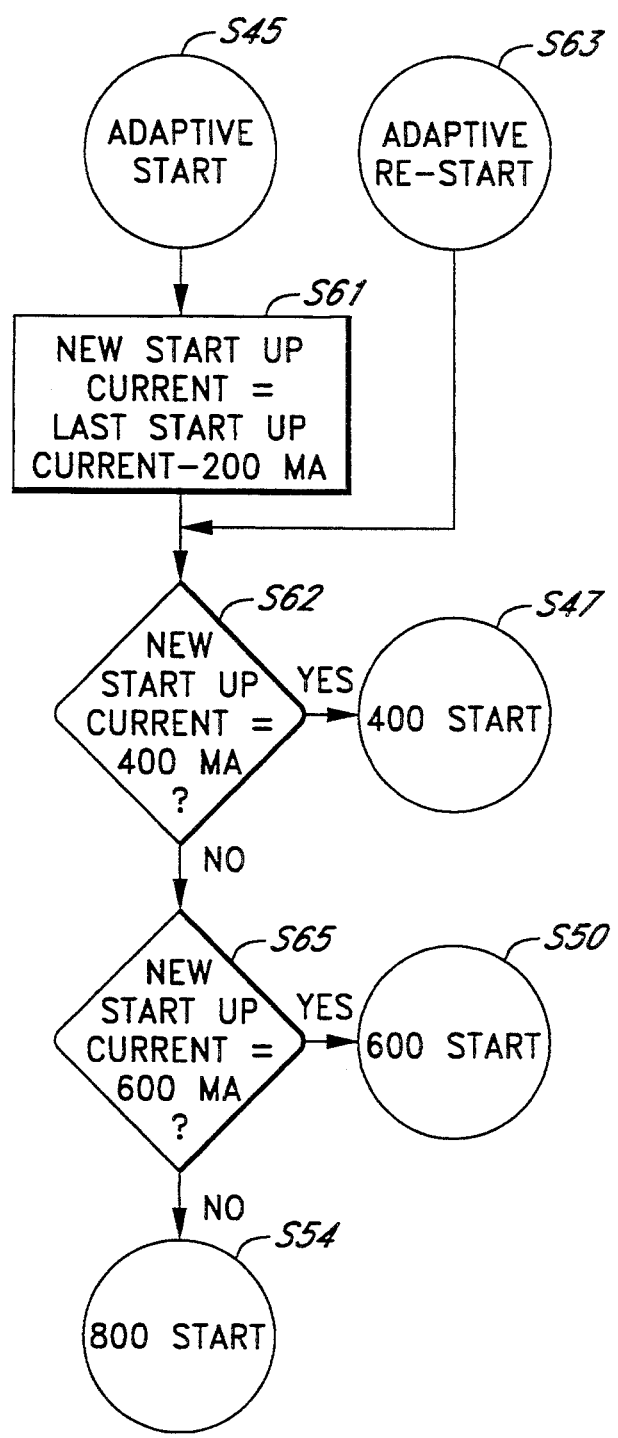
FIG. 14 is a schematic flowchart of an operation of the disk drive control method of the present invention showing a sequence of the adaptive start step shown in the flowchart of FIG. 12.

FIG. 14 shows a flow chart of procedure for the adaptive start of the spindle motor that start at the step S45 which is also shown in FIG. 12. The purpose of the adaptive start is to seek a new start up current which is smaller than the last start up current by 200 mA, for example, when the last start up current is not the minimum current 400 mA. This is because even the last start up current is not the minimum value, i.e., 400 mA in this example, it is possible that the spindle motor will start rotation by a smaller amount of start up current depending on the situation surrounding the spindle motor. For example, if the time interval between the end of the last operation of the spindle motor and the present attempt of driving the spindle motor is relatively small, such as several minutes, the amount of the sticktion in the spindle motor should be relatively small and would be easier to start rotation. Thus, the present invention provides the adaptive start procedure for reducing the start up current when the last drive current is not the minimum value.

In FIG. 14, the adaptive start procedure is initiated at the step S45. The adaptive procedure advances to a step S61 wherein a new start up current which is smaller than the last start up current by 200 mA is calculated by the micro-controller 144. In a step S62, it is determined whether the new start up current thus calculated in the step S61 is 400 mA or not. The step S62 is also activated by an adaptive restart step shown in a step S63 which will be described in more detail later with respect to FIG. 15. If the new current is 400 mA (i.e., the last start up current was 600 mA), then the flow diagram proceeds to the step S47, the detailed process is shown in FIG. 12, to apply the 400 mA drive current to the spindle motor.

If the new current is not 400 mA, then the procedure advances to a step S65 wherein it is determined whether the new start up current is 600 mA or not. If the new current is 600 mA (i.e., the last start up current before subtracting 200 mA in the step S61 was 800 mA), the procedure moves to the step S50, the detailed process of which is shown in FIG. 13, to apply the 600 mA to the spindle motor. If the new current is not 600 mA (i.e., the last start up current is over 800 mA which case arises where the automatic drive current control of the present invention is not used), then the procedure moves to the step S54 wherein the 800 mA start up current is applied to the spindle motor, the detailed process of which is shown in FIG. 13.

Figure 15:
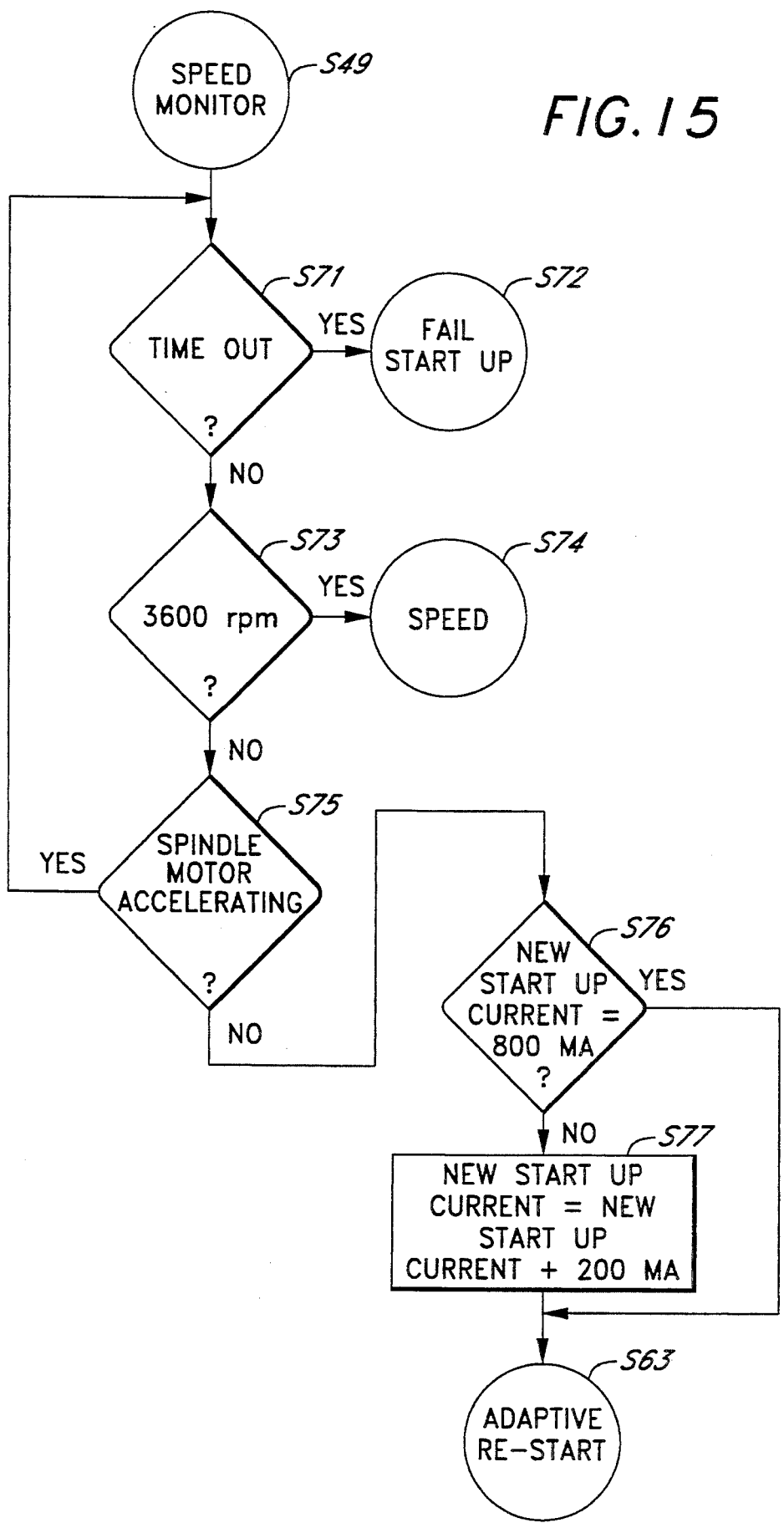
FIG. 15 is a schematic flowchart of an operation of the disk drive control method of the present invention showing a sequence of the speed monitor step shown in the flowchart of FIGS. 12 and 13.

FIGS. 15 shows a detailed flow chart for monitoring the rotation speed of the spindle motor. This flow starts at the step S49 shown in FIGS. 12 and 13. In FIG. 15, after the speed monitoring procedure is initiated in the step S49, the procedure moves to a step S71 wherein it is determined whether the spindle motor rotates within a predetermined time period at a rotation speed higher than the predetermined rotation rate. If the spindle motor rotation is considered to be in a time-out state (i.e., the spindle motor does not rotate at all or rotates too slowly), then the algorithm decides, in a step S72, that the start up operation in the spindle motor is failed and moves to a step S84 in FIG. 16.

If the'spindle motor rotation is not in the time-out state in the step S71, the process advances to a step S73 wherein it is determined whether the rotation rate of the spindle motor is 3,600 rpm. This measurement is made by counting, for example, a signal in the spindle motor control circuit 154 in FIG. 6 which is detected by the read/write head with respect to a clock signal in the disk drive. If the rotation rate is reached 3,600 rpm, the procedure advances to a step S74 to indicate the rotation speed which will be described later. If the rotation speed is not 3,600 rpm, then the operational flow moves to a step S75 wherein it is determined whether the spindle motor is accelerating. This measurement is made, for example, by comparing the counted number of signals detected from the spindle motor control circuit 154 in each unit time length and detecting whether the counted number is increasing. If the spindle motor is accelerating, the process goes back to the step S71 described to repeat the procedures of the steps S71–S75.

If the spindle motor is not accelerating, the procedure proceeds to a step S76 wherein it is determined whether the new start up current is 800 mA. If the answer is YES, then the flow goes to the step S63 wherein the procedure initiates the adaptive restart. Namely, this is a case where the last start up current is 800 mA (the step S43 in FIG. 12) and the present drive current is reduced to 600 mA (the step S61 in FIG. 14) by the adaptive start process as described above. Since this current level (600 mA) is not high enough to accelerate the spindle motor, the process advances to the adaptive restart process. As shown in FIG. 14, in the adaptive restart process, the new start up current is not decreased by the step S61 and thus, the procedure advances to the 800 mA start of the step S54.

If the answer in the step S76 is NO, the operation proceeds to a step S77 wherein the start up current is increased by 200 mA and forwards to the step S63 to initiate the adaptive restart process. Therefore, the start up current is increased in this case to accelerate the rotation rate in the spindle motor. As shown in FIG. 14, in the adaptive restart process, the start up current is applied to the spindle motor without the reduction in the step S61. In case where the drive current 600 mA is still not sufficient, through the procedure of the 600 mA start process in FIG. 13 and the steps S76 and S77 in FIG. 15, the start up current is further increased to the 800 mA level to forward to the adaptive restart in FIG. 14.

Figure 16:
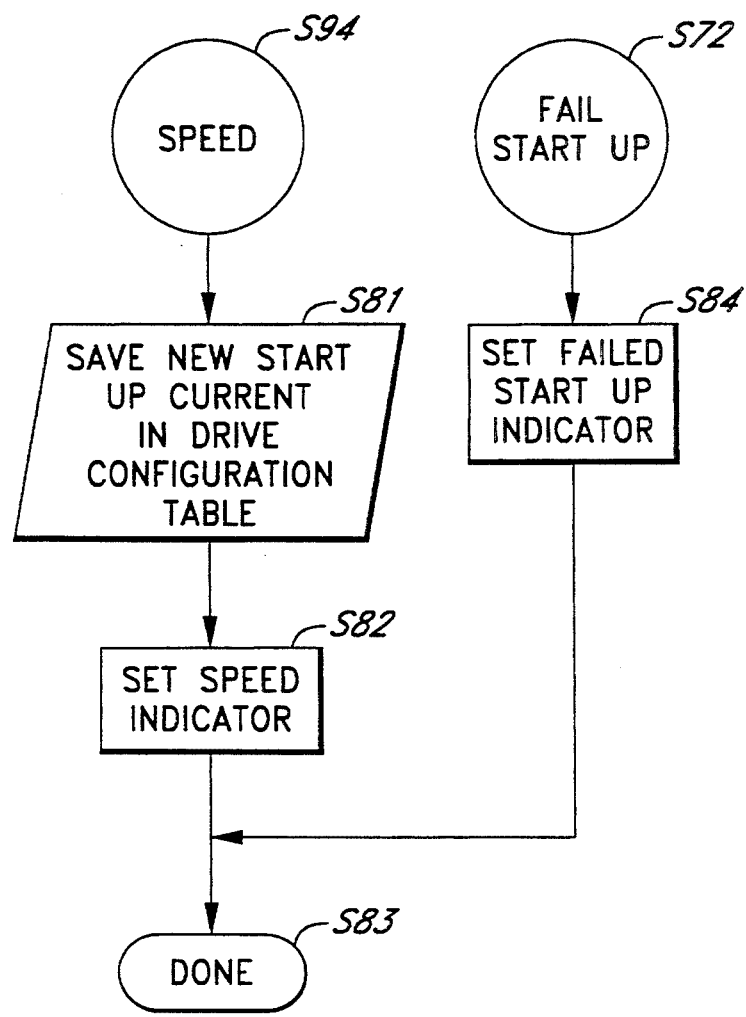
FIG. 16 is a schematic flowchart of an operation of the disk drive control method of the present invention showing a sequence of the speed indication step and the fail start up step shown in the flowchart of FIG. 12.

FIG. 16 shows a flow chart for finalizing the process of automatic drive current control for the spindle motor of the present invention. As described above, if the start up process of the spindle motor fails in the steps S71 and 72, the procedure moves to a step S84. In the step S84, the disk drive sets a failed start indicator and terminates the operation at step S83. In such a case, the automatic drive current control of the present invention is released so that the disk drive can apply a larger current to the spindle motor. Alternatively, it may be necessary to make repairs or overhaul the disk drive because the sticktion level exceeds the tolerable level for commercial purposes.

When the spindle motor rotates at its rated speed, i.e., 3,600 rpm, this speed is indicated by the process starting at a step S94. In a step S81, the information on the start up current used in this procedure is stored in the drive configuration table on the disk. This information is used for the next start up of the spindle motor by, for example, by the step S43 of FIG. 12. After saving the new start up current in the step S81, the procedure moves to a step S82 wherein the rotation speed is indicated in the controller 144. The overall process of the spindle motor start up is finalized at a step S83, and by a command signal from the micro-controller 144, the read/write operation will start.

As set forth above, according to the present invention, the disk drive can provide the selectable access time versus power consumption relationship for the actuator operation, and the automatic selection of the optimum start up current for the spindle motor. By this capability, the disk drive of the present invention can considerably reduce the power consumption associated with the mechanical movements in the disk drive and thus can extend the battery life installed in the host computer.

Although the preferred embodiments of the present invention have been described and illustrated, it will be apparent to those skilled in the art that various changes and modifications can be made to the present invention without departing from its spirit.

We claim:

1. A disk drive apparatus for driving a magnetic disk to read and write information therein, said disk drive apparatus having an actuator assembly for positioning a read/write head on the surface of the magnetic disk, a spindle motor for rotation of the magnetic disk, and an electronic circuit for controlling the operation of the above elements, wherein said disk drive apparatus further comprising:
   a memory for storing a set of information regarding (1) access time versus actuator drive current for said actuator assembly, and (2) start-up current versus frictional resistance in said spindle motor, where said access time is defined as the time required for said actuator assembly to transfer said read/write head from one position to another on said magnetic disk, and said start-up current is defined as the current required for said spindle motor to overcome said frictional resistance and to start rotation in order to reach a predetermined rotation speed;
   a memory for setting a user access time in said disk drive apparatus by a user of the disk drive apparatus;
   a micro-controller for evaluating said user access time and selecting the lowest possible actuator drive current within the range defined in said information in said memory to satisfy said user access time, said micro-controller selecting the actuator drive current selected immediately prior to the present operation when said user access time is not provided, said micro-controller further selecting the lowest possible start-up current for said spindle motor corresponding to said frictional resistance in the current state of said spindle motor with reference to said information; and
   a current limiter for limiting a current level for said disk drive apparatus based on said current level determined by said micro-controller.

2. A disk drive apparatus as defined in claim 1, wherein said set of information is pre-programmed by a manufacturer of said disk drive apparatus and said user access time is set by said user of a host computer installing said disk drive apparatus.

3. A disk drive apparatus as defined in claim 2, wherein said user access time is stored in said magnetic disk and read therefrom every time said actuator assembly is instructed to operate so that said disk drive apparatus employs the same access time versus power consumption relationship until it is renewed by said user.

4. A disk drive apparatus as defined in claim 2, wherein said user access time is range checked by said micro-controller as to whether the user access time is within the range defined by said manufacturer in said set of information.

5. A disk drive apparatus as defined in claim 2, wherein said user access time is described in a lower nibble of a predetermined standard command code used in host computer which is connected to the disk drive apparatus.

6. A disk drive apparatus for driving a magnetic disk to read and write information therein, said disk drive apparatus having an actuator assembly for positioning a read/write head on the surface of the magnetic disk, a spindle motor for rotation of the magnetic disk, and an electronic circuit for controlling the operation of the above elements, wherein said disk drive apparatus further comprising:
   a memory for storing a set of information regarding start-up current versus frictional resistance in said spindle motor, where said start-up current is defined as a current required for said spindle motor to overcome said frictional resistance and to start rotation for reaching a predetermined rotation speed;
   a micro-controller for evaluating said frictional resistance in the current state of said spindle motor and selecting the lowest possible start-up current for said spindle motor to start rotation with reference to said information in said memory; and
   a current limiter for limiting a level of said start-up current for said spindle motor according to the instruction from said micro-controller.

7. A disk drive apparatus as defined in claim 6, wherein two or more of said current levels are provided in said memory so that said micro-controller instruct said current limiter to select one of said current levels to drive said spindle motor.

8. A disk drive apparatus as defined in claim 7, wherein said micro-controller instructs said current limiter to provide the lowest drive current to said spindle motor and when said spindle motor does not effectively rotates said micro-controller instructs said current limiter to generate a one step larger drive current.

9. A disk drive apparatus as defined in claim 6, wherein said micro-controller attempts to reduce said drive current by one step when said spindle motor starts rotation by the current level greater than said lowest level.

10. A disk drive apparatus as defined in claim 6, wherein data on said drive current level for initiating the rotation of said spindle motor is stored in a predetermined location of said magnetic disk every time the spindle motor is activated, said data being read out from said magnetic disk and being checked whether said drive current in said data is the lowest level, said micro-controller determining an optimum level of said drive current when said stored data disagrees with said lowest level.

11. A method for determining a drive current level for a disk drive apparatus for use in a host computer, wherein said disk drive apparatus having a magnetic disk for storing information, an actuator assembly for positioning a read/write head on the surface of the magnetic disk, a spindle motor for rotation of the magnetic disk, and an electronic circuit for controlling the operation of the above elements, said method comprises the following steps of:
   storing a set of information regarding (1) access time versus actuator drive current for said actuator assembly, and (2) start-up current versus frictional resistance for said spindle motor,
   providing a user access time for said actuator assembly by a user of said disk drive apparatus,
   determining current levels for either said actuator assembly and said spindle motor based on said set of information wherein said current level for said actuator assembly is selectively determined based on said user access time or said set of information, and said current level for said spindle motor is determined based on the present condition regarding the frictional resistance against rotation in said spindle motor with reference to said set of information, and limiting drive current applying to said actuator and said spindle motor based on said determined current level.

* * * * *